(12) United States Patent
Otero et al.

(10) Patent No.: US 7,496,535 B2
(45) Date of Patent: Feb. 24, 2009

(54) COMPUTERIZED INTERFACE FOR CONSTRUCTING AND EXECUTING COMPUTERIZED TRANSACTION PROCESSES AND PROGRAMS

(75) Inventors: Hernan G. Otero, Huntington, NY (US); Steven B. Horn, New York, NY (US); John Tumilty, New York, NY (US)

(73) Assignee: Goldman Sachs & Co., New York, NY (US)

( * ) Notice: Subject to any disclaimer, the term of this patent is extended or adjusted under 35 U.S.C. 154(b) by 734 days.

(21) Appl. No.: 09/872,687

(22) Filed: May 31, 2001

(65) Prior Publication Data
US 2002/0046151 A1 Apr. 18, 2002

Related U.S. Application Data

(63) Continuation-in-part of application No. 09/823,125, filed on Mar. 30, 2001, which is a continuation-in-part of application No. 09/773,139, filed on Jan. 31, 2001, now abandoned.

(60) Provisional application No. 60/241,807, filed on Oct. 14, 2000.

(51) Int. Cl.
*G06Q 40/00* (2006.01)
(52) U.S. Cl. .......................... 705/37; 705/35
(58) Field of Classification Search ................. 705/36, 705/37, 36 R, 35; 345/650, 661
See application file for complete search history.

(56) References Cited

U.S. PATENT DOCUMENTS

| 5,434,395 | A | 7/1995 | Storck et al. |
| 5,918,218 | A | 6/1999 | Harris et al. |
| 5,950,176 | A | 9/1999 | Keiser et al. |
| 6,026,440 | A | 2/2000 | Shrader et al. |
| 6,119,104 | A | 9/2000 | Brumbelow et al. |
| 6,125,442 | A * | 9/2000 | Maves et al. ................. 712/220 |
| 6,134,535 | A | 10/2000 | Belzberg |
| 6,161,098 | A * | 12/2000 | Wallman ...................... 705/36 |
| 6,236,972 | B1 * | 5/2001 | Shkedy .......................... 705/1 |
| 6,317,727 | B1 * | 11/2001 | May ............................ 705/37 |
| 6,317,728 | B1 * | 11/2001 | Kane ........................ 705/36 R |
| 6,405,173 | B1 * | 6/2002 | Honarvar et al. ............... 705/7 |
| 6,421,653 | B1 * | 7/2002 | May ............................ 705/37 |
| 6,629,081 | B1 * | 9/2003 | Cornelius et al. ............. 705/30 |
| 6,801,199 | B1 * | 10/2004 | Wallman ..................... 345/440 |
| 2003/0004853 | A1 * | 1/2003 | Ram et al. .................... 705/37 |
| 2003/0041000 | A1 * | 2/2003 | Zajac et al. ................... 705/37 |
| 2004/0143542 | A1 * | 7/2004 | Magill et al. .................. 705/37 |

OTHER PUBLICATIONS

Thompson, M., "Microcontrollers' fuzzy logic and 16-bit MCUs: a matter of intuition," WESCON/97. Conference Proceedings on Nov. 4-6, 1997 pp. 219-221.*

(Continued)

*Primary Examiner*—Alexander Kalinowski
*Assistant Examiner*—Thu Thao Havan
(74) *Attorney, Agent, or Firm*—Buckley, Maschoff & Talwalkar LLC

(57) ABSTRACT

An interface primarily used in computerized trading processes. In the especially preferred embodiments, the interface comprises a first sub-interface that allows "plug ins" to be dynamically created and/or edited. The plug ins are executed by a logic engine in which uses various inputs and outputs to obtain necessary information, process the order, and execute the order. The interface can additionally comprise a second sub-interface used to track orders, as well as a third sub-interface used to monitor orders.

12 Claims, 22 Drawing Sheets

OTHER PUBLICATIONS

Teodorescu, H.-N.; Yamakawa, T., "A new strategy in fuzzy inference systems and in AI: the selective rules activation (SRA) algorithm," Fuzzy Systems, 1993., Second IEEE International Conference on Mar. 28-Apr. 1, 1993 pp. 934-937 vol. 2.*

Rosner, P.; Magennis, M.; Newman, A., "In Touch: a graphical user interface development tool," Software Tools for Interface Design, IEE Colloquium on Nov. 8, 1990 pp. 12/1-12/7.*

* cited by examiner

COMPUTERIZED INTERFACE FOR CONSTRUCTING AND EXECUTING COMPUTERIZED TRANSACTION PROCESSES AND PROGRAMS

CROSS-REFERENCE TO RELATED APPLICATIONS

This application is related to provisional application U.S. Ser. No. 60/241,807, by Steven B. Horn, John A. Fanelli, Hernan G. Otero and John Tumilty, which disclosure is incorporated herein by reference; and, U.S. Ser. No. 09/823,125, entitled "APPARATUS, METHODS AND ARTICLES OF MANUFACTURE FOR CONSTRUCTING AND EXECUTING COMPUTERIZED TRANSACTION PROCESSES AND PROGRAMS" filed on Mar. 30, 2001, by Hernan G. Otero, Steven B. Horn and John Tumilty, which disclosure is incorporated herein by reference.

FIELD OF THE INVENTION

This invention relates to apparatus, methods and articles of manufacture for computerized transaction execution and processing. Particularly, this invention relates to an interface for a financial transaction execution and processing system. More particularly, this invention relates to a graphical user interface for a financial transaction execution and processing system.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Computerized transaction execution and processing requires an enormous, and often detrimental, amount of time and resources. The time and resources are required because, in most instances, execution and processing are based upon customized implementations of the transaction.

Customized transaction implementations require new programming. New programming requires cost and effort—not only for the first attempt, but also for the debugging and testing processes. Moreover, once the program is debugged and released, real world implementations require yet further testing and debugging.

All this effort takes resources and time. It takes resources because the programmers must first develop the program with input from the users, and then the users themselves must test the program in the field, to ensure reliable operation. The effort required means that the users may be too busy doing their job to assist in programming efforts. Thus the program may not ever be developed. Moreover, by the time any particular program is developed, the markets may have shifted away from the initial transactional conditions that first provided the impetus for developing the program. For example, specific trading strategies are usually constructed and executed on a customized basis, yet by the time the program is developed for those strategies, and those strategies are executed, they may be no longer useful.

The cost, effort and time factors are not solely the result of required programming. In trading transactions, the programmers must be advised by the traders or other business professionals regarding desired trading strategies and desired markets. These professionals are busy in their own right—they may have little or no time to advise the programmers on what new strategies and markets should be developed. Even if they can advise the programmers, trading strategies can become quite complex, and in order to communicate those strategies and implement those strategies effectively, the programmer and trader interactions cost time, money and resources.

Enterprise-wide customization adds yet another level of time, effort and complexity. What may be useful in one enterprise business unit may not be useful in another, and time, effort and resources may not be available to implement specific programs customized for each business unit.

Any implementations must be quite robust, and reliably and consistently execute trading strategies. The implementation of new computerized transactional programs must be as close to bullet proof as possible—failure of a trading program can mean losses in thousands, millions or even billions of dollars. Developing reliable implementations of trading programs means that testing procedures and recovery procedures must always be paramount considerations.

Finally, the interfaces to the programs used in trading systems need to be improved to provide improved functionality and ease of use.

Accordingly, it is an object of at least an embodiment of the invention to provide apparatus, methods and articles of manufacture for an interface for constructing and executing transactions.

It is a further object of at least an embodiment of this invention to provide open-ended apparatus, interfaces, methods and articles of manufacture for constructing and executing transaction processes and programs.

It is a further object of at least an embodiment of this invention to provide robust and reliable apparatus, methods and articles of manufacture for a user interface for implementing trading strategies.

The scope of the invention is not limited in any way by the objects. Further objects will become evident in the description that follows, and in part will be obvious from the description, or may be learned by practice of the invention.

BRIEF DESCRIPTION OF THE DRAWINGS

FIG. 3 is a screen shot of a preferred embodiment of the trading system.

FIG. 13 is a screen shot of a preferred embodiment of the trading system.

SUMMARY OF THE INVENTION

The present invention provides apparatus, interfaces, methods and articles of manufacture for open-ended construction and execution of computerized transaction processes. In the preferred embodiments, an engine is used in the trading system that permits "plug-ins" to be used for construction, modification and alteration of trading procedure execution. These plug-ins can be preconstructed, or constructed when appropriate, and applied to the engine when desired. The embodiments further comprise an interface used in computerized trading processes, which may configure, create and/or edit the plug ins for subsequent use in the engine; which may monitor and/or track orders executed through the system and otherwise; and which may monitor the order server.

In the especially preferred embodiments, the interface is comprised of three sub-interfaces: a first sub-interface that allows transactional algorithms to be dynamically created and/or edited and used as plug-ins; a second sub-interface that monitors and/or track orders executed through the system and otherwise, and a third sub-interface that monitors the order server. Each of the sub-interfaces, as well as the interface, may be further comprised of a graphical user interface.

DETAILED DESCRIPTION OF THE PREFERRED EMBODIMENTS

The preferred embodiments of the present invention comprise an interface, connected to a trading system including an engine infrastructure, for open-ended construction and execution of computerized trading processes. Java is the preferred language, although other embodiments may be in other languages. Therefore, the embodiments may be used across a wide variety of networked platforms.

Figure 1:
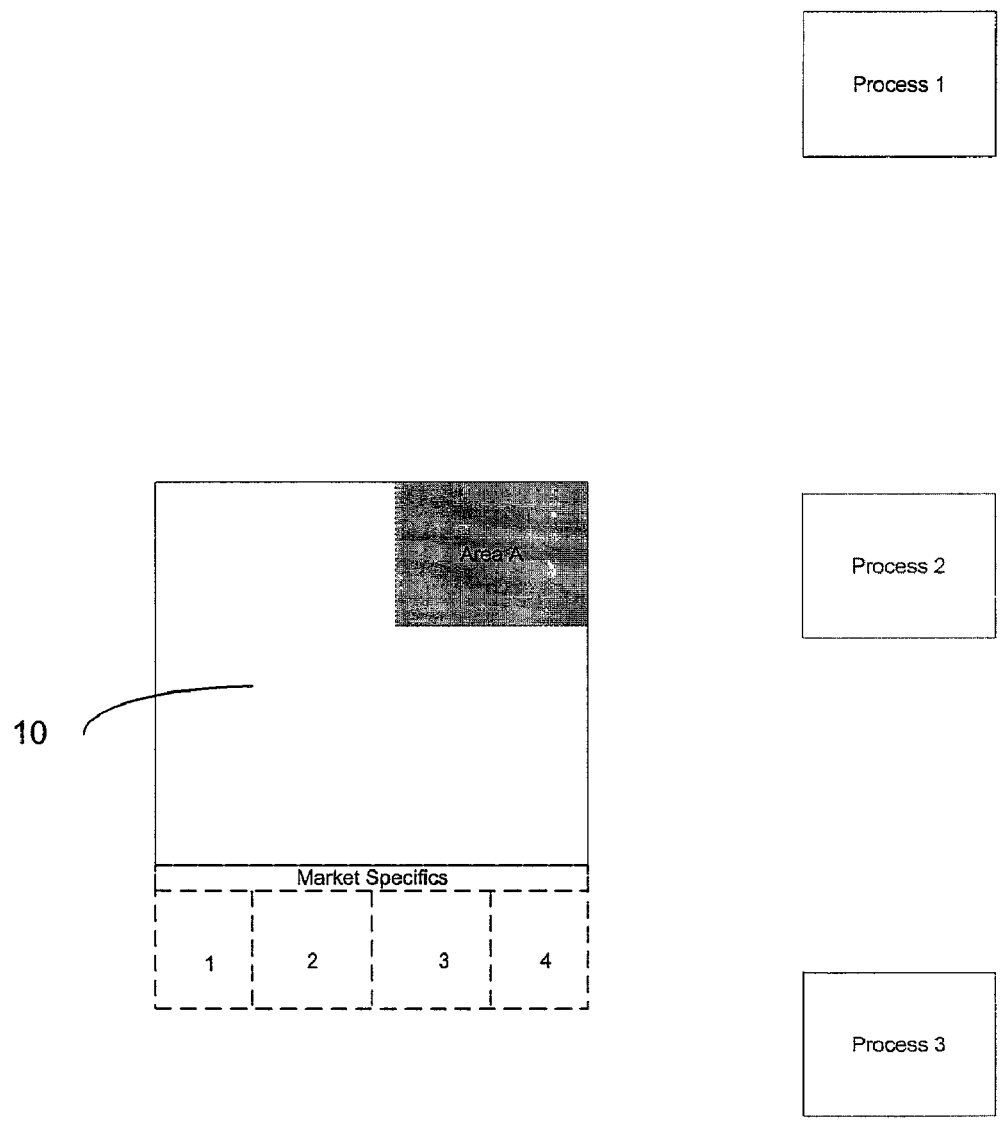
FIG. 1 is a schematic diagram of a preferred embodiment of the trading system.

FIG. 1 shows a schematic diagram of the engine infrastructure of a preferred embodiment. Written in Java, and present on the server, this software enables various data, plug-ins, applications, processes, and algorithms to be used in order to customize the trading process. These data, plug-ins, applications, processes, and algorithms are imported or plugged into the engine as desired in order to implement a particular trading strategy.

Seen in FIG. 1 are various processes to be used in the engine 10. Area A of engine 10 symbolizes the area in which the plug-ins can be placed. Also seen at 10 is an area labeled "Market Specifics." This area, also supporting customization through data, plug-ins, applications, processes, and algorithms permits customization of any particular algorithm for any particular market in a manner explained in further detail below. In other embodiments, the plug-ins used for the various areas can be internal or external to the engine. Hereinafter, "plug-ins" will be used as a general term for data, plug-ins, applications, processes, and algorithms. Engine 10, in this embodiment, provides services for the plug-ins. For example, most trading strategy plug-ins will need to access market data. Most trading strategy plug-ins will need to send orders to the exchange and be notified of executions, etc. Engine 10 provides these and other services to the plug-ins. For example in a preferred embodiment, engine 10 provides:

A real time market data feed driver (e.g. Reuters SSL, TIB/Rendezvous feeds.)

An exchange driver where the algorithm sends orders and receives executions back.

A driver implementation that sends orders to one or more order management architecture(s) and/or system(s) server(s) is provided.

An input driver which enters requests to the engine 10.

Figure 2:
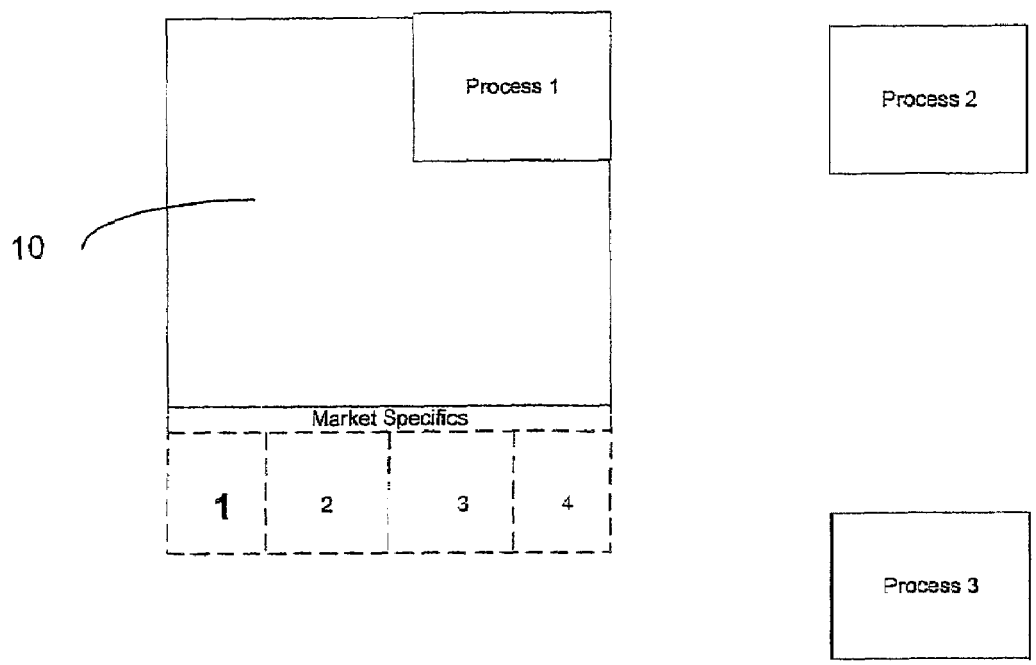
FIG. 2 is a schematic diagram of a preferred embodiment of the trading system.

FIG. 2 shows Process 1 implemented in engine 10. Process 1 might be a trading process such as Volume-Weighted-Average-Price or VWAP. The VWAP algorithm used in this embodiment, attempts to match the VWAP for a given instrument, such as an equity throughout a specified lifespan (e.g. throughout the full trading day). VWAP will maintain a number of limit orders in the market at different price levels. In order to trade according to the VWAP algorithm of this embodiment, the engine will listen to market data throughout the day and access a volume profile to match the day's VWAP as close as possible.

The trader will then be able to review, thorough his screen, the order as it is being executed according to the VWAP algorithm. Any updates and/or changes will be simply made through his or her screen.

If a second VWAP algorithm was desired to be used, such as one that is based on theoretical values to trading, this second plug-in can be substituted for the first in the engine. This second plug-in will then be used by the engine.

Returning to FIG. 2, the Market Specifics plug-in 1 has been chosen. Market specifics provide specific variables, data and other plug-ins necessary for the specific market in which the embodiment is being used. For example, they may be different limits on trading volume in one market versus another. The preferred embodiments permit configuration and modification of these Market Specifics, by plug-ins, so that they may be used in a variety of markets as desired.

In the preferred embodiments, the plug-ins comprise two types. The first type comprise algorithms used in trading. The second type comprise market-specific rules. Thus, for example, in the preferred embodiments, the engine can be configured with a specific algorithm, such as a first VWAP algorithm and for a specific market for a first trade such as the New York Stock Exchange and then modified for another specific algorithm such a Ratio algorithm and another specific market such as the Tokyo Stock Exchange for a second trade. In the especially preferred embodiments, the engine will carry out a number of trades using a specific algorithm, which has been chosen from a set of preconfigured algorithms. The algorithm used may be parameterized by the trader, in order to execute specific trades for a specific stock, price and number of shares. In these embodiments, the algorithm plug-in used is usually consistently used for that implementation of the embodiment during that particular trading period—whether it be an hour, day, week, etc. Of course, other embodiments may change their algorithm during any particular trading period. Moreover, the especially preferred embodiments usually maintain the market plug-in for at least the trading period, and usually longer. A trader, for example, may trade exclusively on the New York Stock Exchange using a preferred embodiment. Note that, using the especially preferred embodiments, the trader will change the algorithm plug-in, embodying his or her trading strategy, much more frequently than his or her market plug-in, as he or she may only trade in a particular market. Network or enterprise wide implementations, however, will use the market plug-in in order to configure any particular implementations for traders in the various trading markets.

This embodiment also effectively provides real-time monitoring of the order by the trader as well as others such as the sales force who desire to monitor the order and its execution. Additionally, orders are fully integrated, and so the trader or others may override individual orders through the system of this embodiment, without an additional messaging system. Similarly, any changes to an order, such as size of the order or a price limit or volume can be echoed to the system of this embodiment and the system will automatically adjust its trading to the new parameters.

Figure 3:
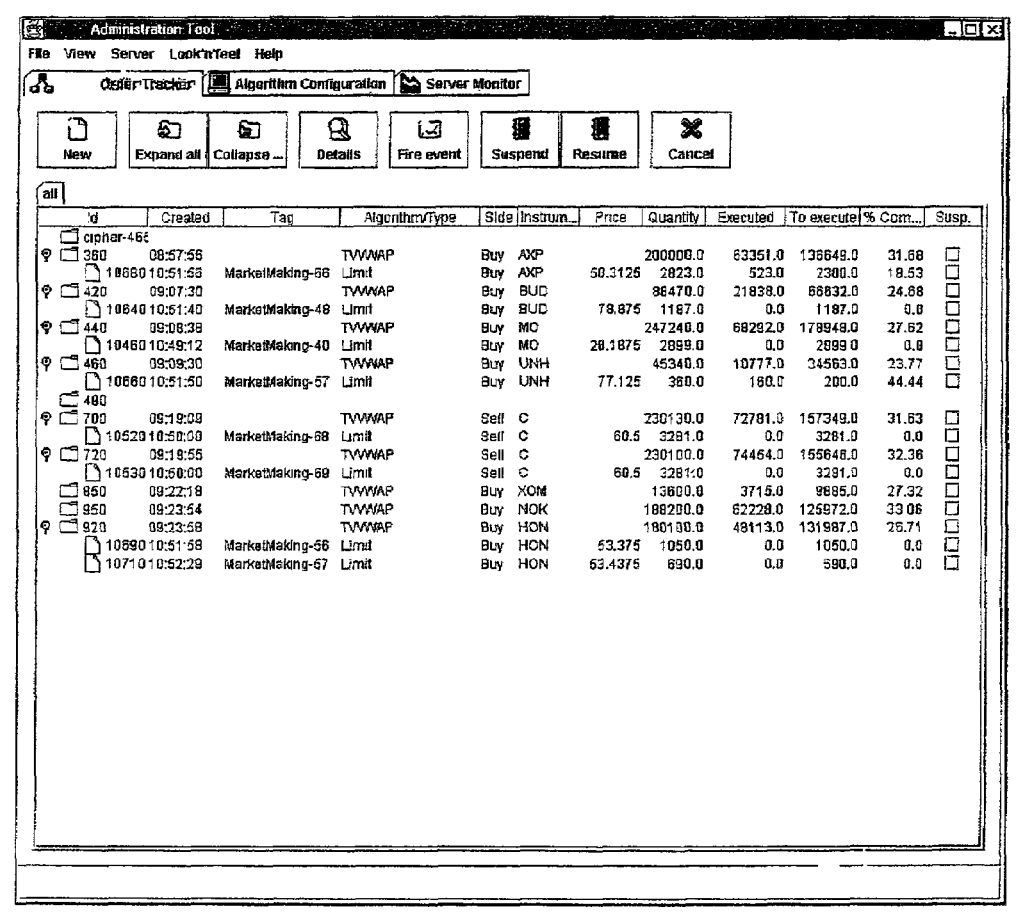
Figure 4:
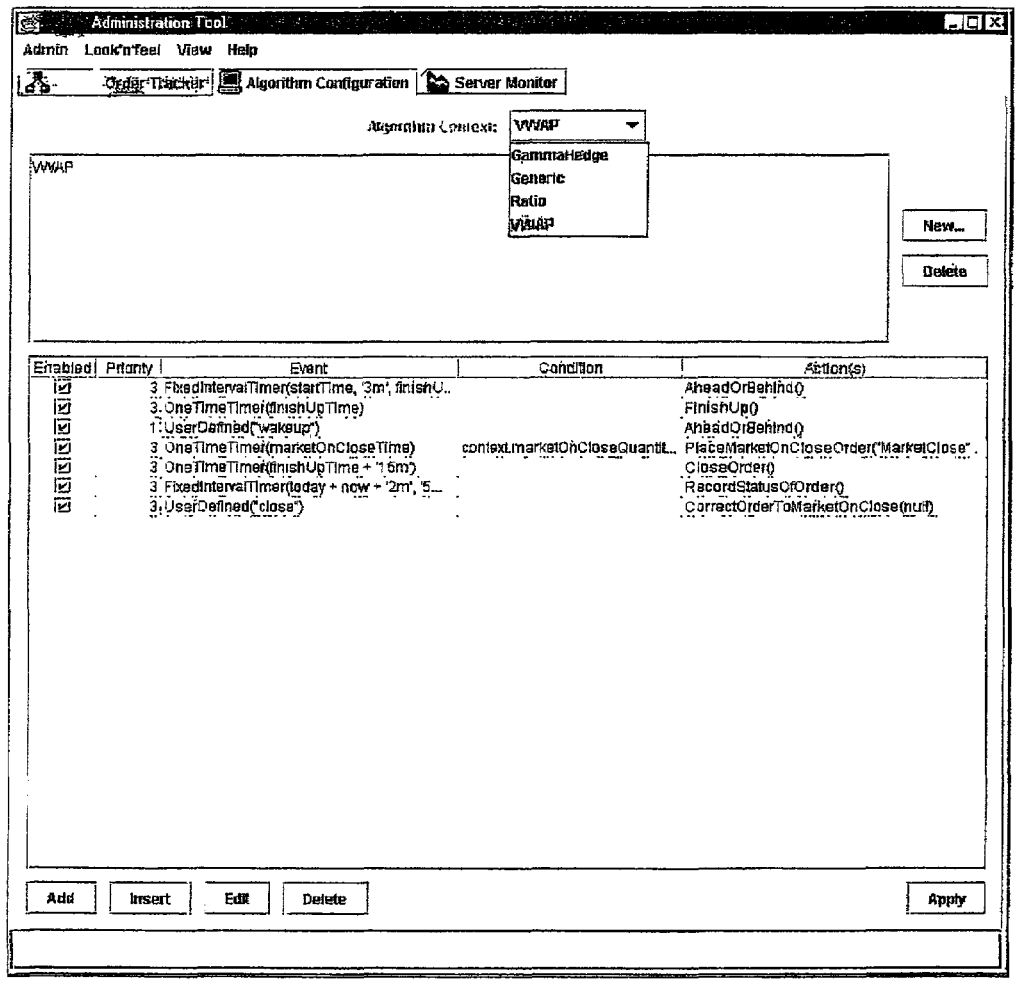
FIG. 4 is a screen shot of a preferred embodiment of the trading system.
Figure 5:
FIG. 5 is a screen shot of a preferred embodiment of the trading system.

Various screen shots of the administration and monitoring tool GUI (written in Java, using Swing) used in a preferred embodiment are shown at FIGS. 3 through 5. These are an Order Tracker screen shown in FIG. 3, an Algorithm Configuration screen shown in FIG. 4, and an Order Details screen shown in FIG. 5. This tool allows for configuring algorithms as well as monitoring the server. This tool may be installed on either or both of the client and server machines and on more than one machine in the networked environment.

In the preferred embodiments, an algorithm is comprised of an Algorithm Context, which may be a Java Class, plus a set of event-action mappings. These algorithms are usually written by a programmer. The mappings may be modified by non-programmers (e.g. a trader) via the graphical tool. The mappings provide a powerful way to fine tune the algorithm. Of course other embodiments may modify the mappings in a different fashion. For example, the programmer may provide the trader or other end user with objects that constitute events, conditions and actions. The trader can then construct his or her own algorithms which are plugged into the invention in order to provide the trader with an automatic execution mechanism.

Other algorithms that may be used in this embodiment include:
  Ratio which tries to buy an instrument and sell a related instrument when the price between the two is more favorable than a specified ratio.
  Gamma Hedge which hedges a portfolio and tries to capture volatility while doing so.
  Aggressive Short Sell which tries to short sell a given instrument by making sure the Tokyo short sell rule is not violated.
  Stop Loss which allows sending stop loss orders to exchanges that do not support this concept.
  Iceberg which tries to trade a specified number of shares by sending only a part of the total order's quantity (the tip of the iceberg) to the market at any given time.
  Auto Trader which decides whether to send trades to the market or fill from an account.
  CB Delta Hedge which sends out underlyer market orders to hedge CB trades.

Of course, other algorithms or plug-ins may be used. Additionally, in the preferred embodiments, preferred methods of constructing and implementing new plug-ins are used. The preferred embodiments also use several Java features, e.g. introspection, reflection and the like, in order to automatically discover properties of the imported algorithms.

If new algorithms are desired, a number of methods can be used to create the algorithm. In this embodiment, if the new algorithm requires no Java code, then the algorithm can be created by leveraging on existing algorithm context classes. Specific classes have been established or predetermined in the preferred embodiments. If the new algorithm is simple enough, it can be created without writing any Java code, making use of the Administrator GUI as described below. This can be done by simply creating a set of event-action mappings that will work on a pre-existing algorithm context class (e.g. the base AlgorithmContext class that is part of the preferred embodiments code classes).

Figure 6:
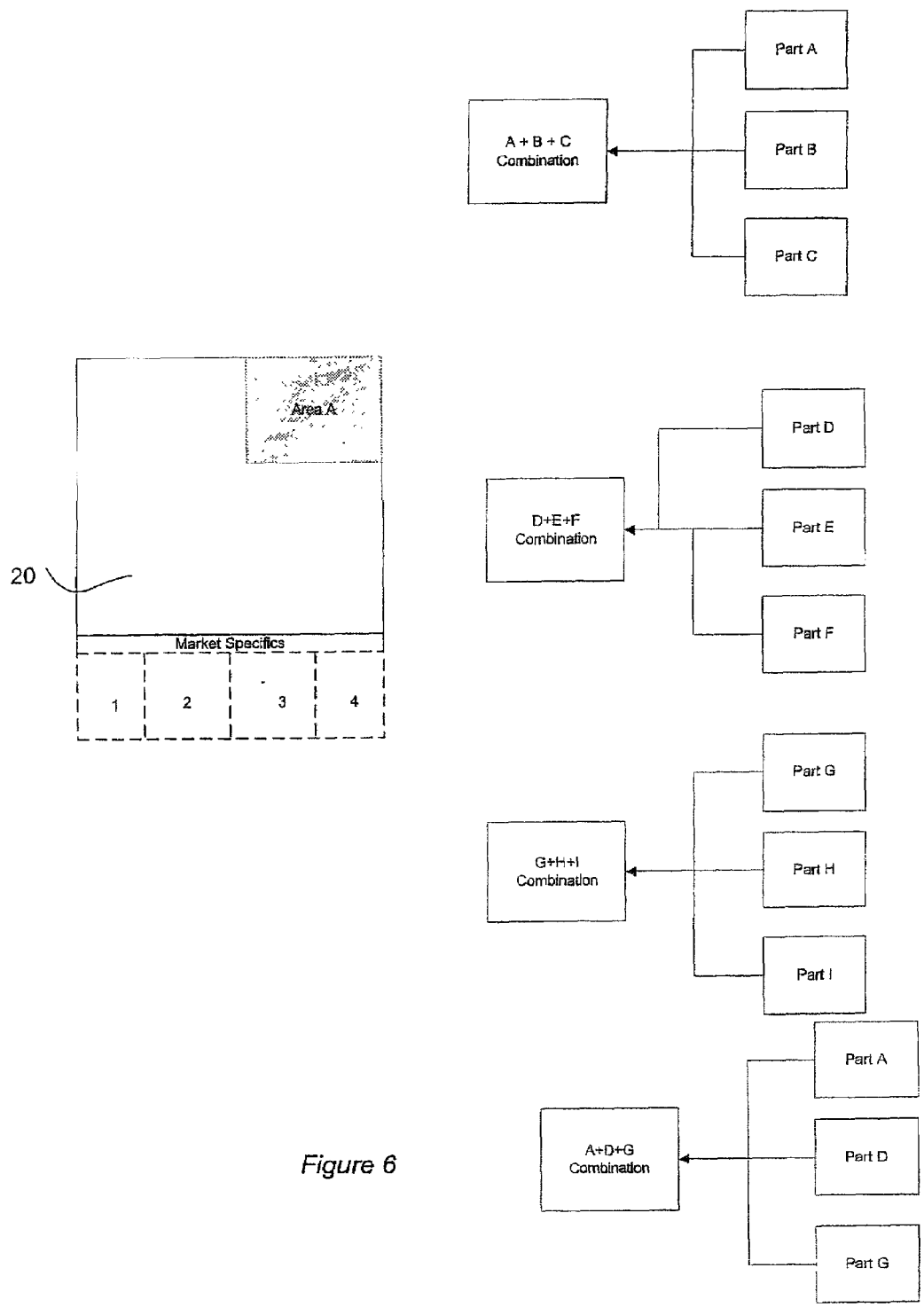
FIG. 6 is a schematic diagram of a preferred embodiment of the trading system.
Figure 7:
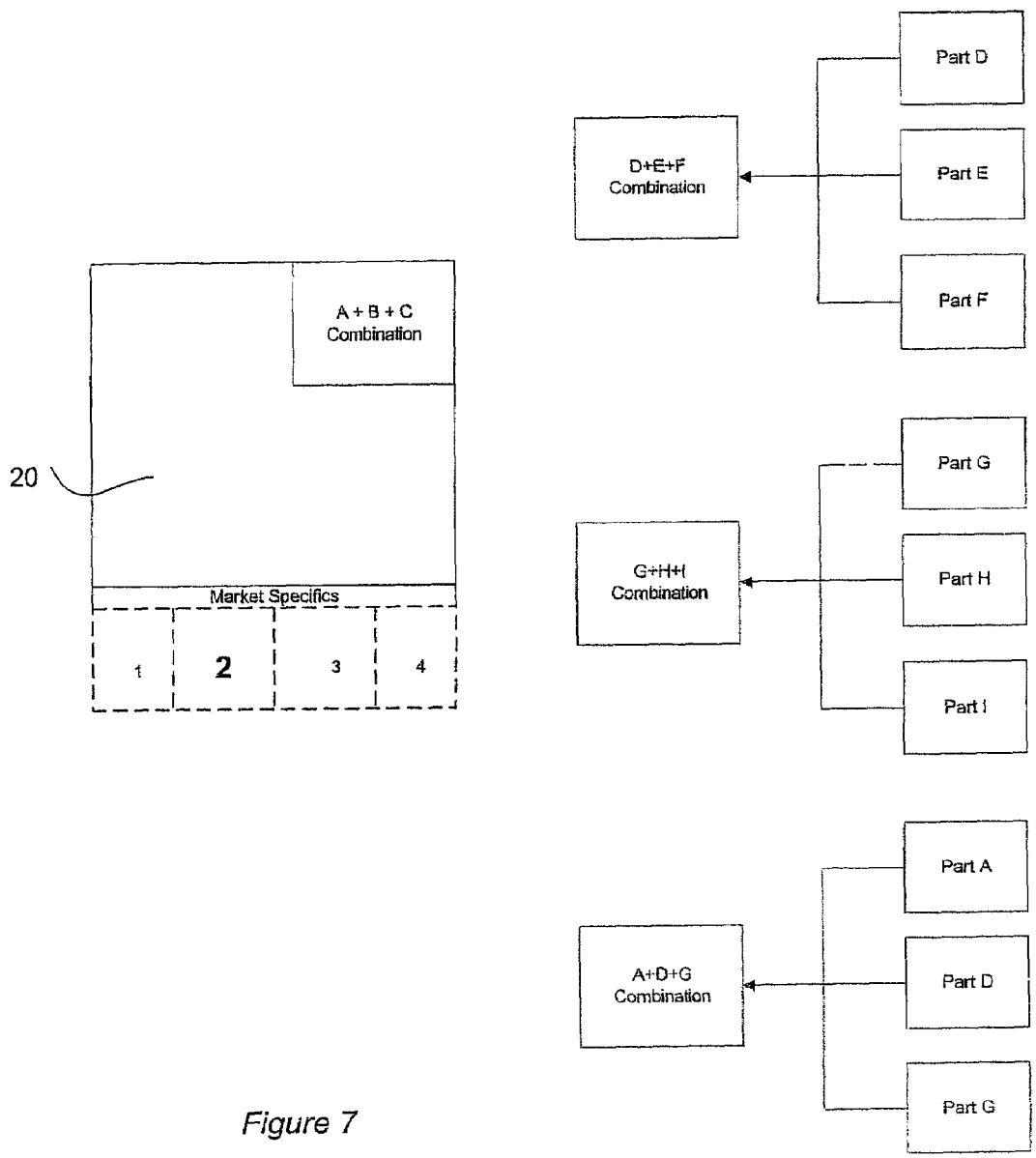
FIG. 7 is a schematic diagram of a preferred embodiment of the trading system.

FIGS. 6 and 7 show how various mappings or parts may be used to construct combinations. Those combinations, constructed in FIG. 3, are then inserted into the engine 20 in FIG. 7. Note that a different Market Specifics plug-in, Market Specifics 2, has been chosen in FIG. 7. These Market Specifics plug-ins may be from a predetermined set. In the especially preferred embodiments, the market plug-in is usually maintained over some static trading period. A trader, for example, may trade exclusively on the New York Stock Exchange, using the market plug-in. In enterprise installations, the market plug-ins may be set for the particular trading markets across the enterprise, and remain as set for a predetermined or static period of time.

Fundamental classes within the architecture of the preferred embodiment are:
  AlgorithmContext,
  Action,
  ActionBindings,
  ActionDispatcher.

If the new algorithm requires writing new code, the fundamental classes within the architecture of the preferred embodiment are: AlgorithmContext, Action, ActionBindings, ActionDispatcher. New Actions might be needed, for new complex algorithms, in order to do simple tasks that the existing actions can not deal with. Algorithms which require saving state during the execution of the order, for example, need to have their own Algorithm Context subclass. The data will then be kept in this new subclass.

The following process is used in the preferred embodiment to write code for a new algorithm. A Simple Algorithm Context must be written, starting with a template of what the class should look like, providing an empty, public constructor, adding in member variables, and providing a public getter/setter pair. Since this preferred embodiment makes use of beans support classes to access properties, JavaBeans conventions are used when naming these methods.

It is important to note that, in the preferred embodiments, traders provide vital feedback and oversight. Moreover, the embodiments evolve through use. There may be a lengthy tuning and feedback phase of algorithm development. The embodiments fit within a scalable architecture, and as the algorithms become more complex and widely used, the embodiments adapt and scale. Additionally, the embodiments must have fast Release Cycles. The preferred embodiments are flexible and separate the algorithm from the engine. Also, the algorithm should be as orthogonal as possible to the rest of the system. By use of this structure in the preferred embodiments, the embodiments can be used to trade and transact across virtually any instruments or exchanges.

In the preferred embodiments, the algorithms are tested for use. Of course, in other embodiments testing may not be desired. There are two main testing stages in a preferred embodiment.

The first stage involves soliciting feedback with the traders and salespeople using the algorithm. The algorithm will not work right the first time, situations will not have been thought of, parameters will be wrong, failsafes will not be good enough and so on. The feedback at this early stage of development ensures not only a quick release but also that modifications can be made in situ.

The second stage of testing in this embodiment involves the continued evolution and updating of an algorithm once it is in production. It is important to have a very extensive series of tests that cover a multitude of trading situations. When changes are made to an algorithm, no matter how slight, every test is run and verified. This is necessary for production systems with a large number of users. Without high confidence that any changes made will not have any unforeseen follow-on effects, the release cycle becomes intolerably long. Of course, other embodiments may utilize different testing methods, including providing sample market feeds rather than real time feeds. The term "executing a trade" and its variants as used herein is meant to cover both actual and simulated execution of a trade.

The preferred embodiments implement a recovery mechanism, which assists the programmer in analyzing and/or recovering from crashes. The recovery process restores execution of orders by taking a number of steps. Those steps comprise:

- Recovering the state of the orders. This involves rebuilding the order hierarchy (parent/child relationships, executed quantities, etc.) as it existed prior to the crash.
- Recovering the exchange information. This involves making sure that all executions/corrections/cancellations that might have been pending when the embodiment crashed and had taken place during its blackout now get reflected in the embodiment's order hierarchy. This is done so that future algorithm decisions get based on the current state of the world, and not the one present before the crash.
- Restarting all algorithms. This is now possible since the algorithms will have their information up-to-date in order to make correct decisions on how to continue their execution. Depending on the complexity of the algorithms involved, this step may be as simple as setting up the event-action mappings for the algorithm context.

The recovery process in this embodiment includes writing to log or journal file. Of course other embodiments may have other recovery processes or recovery steps.

Figure 8:
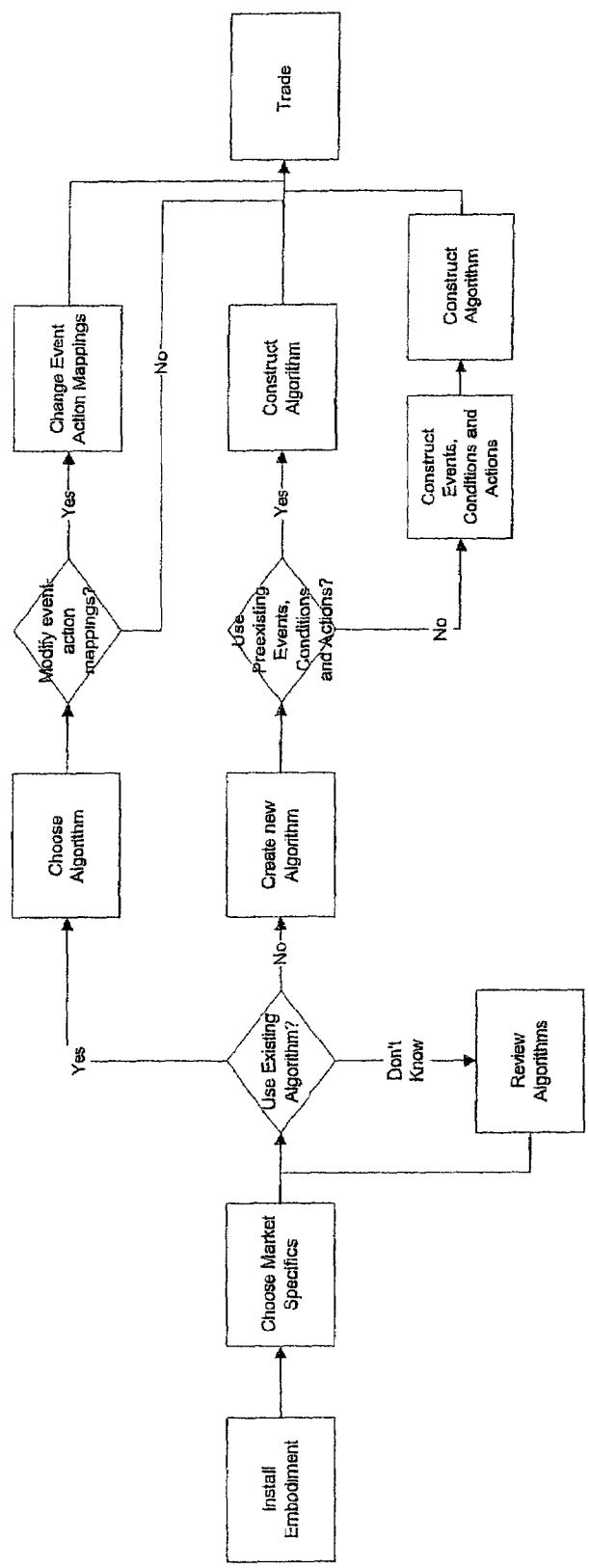
FIG. 8 is a flow chart of a preferred embodiment of the trading system.
Figure 9:
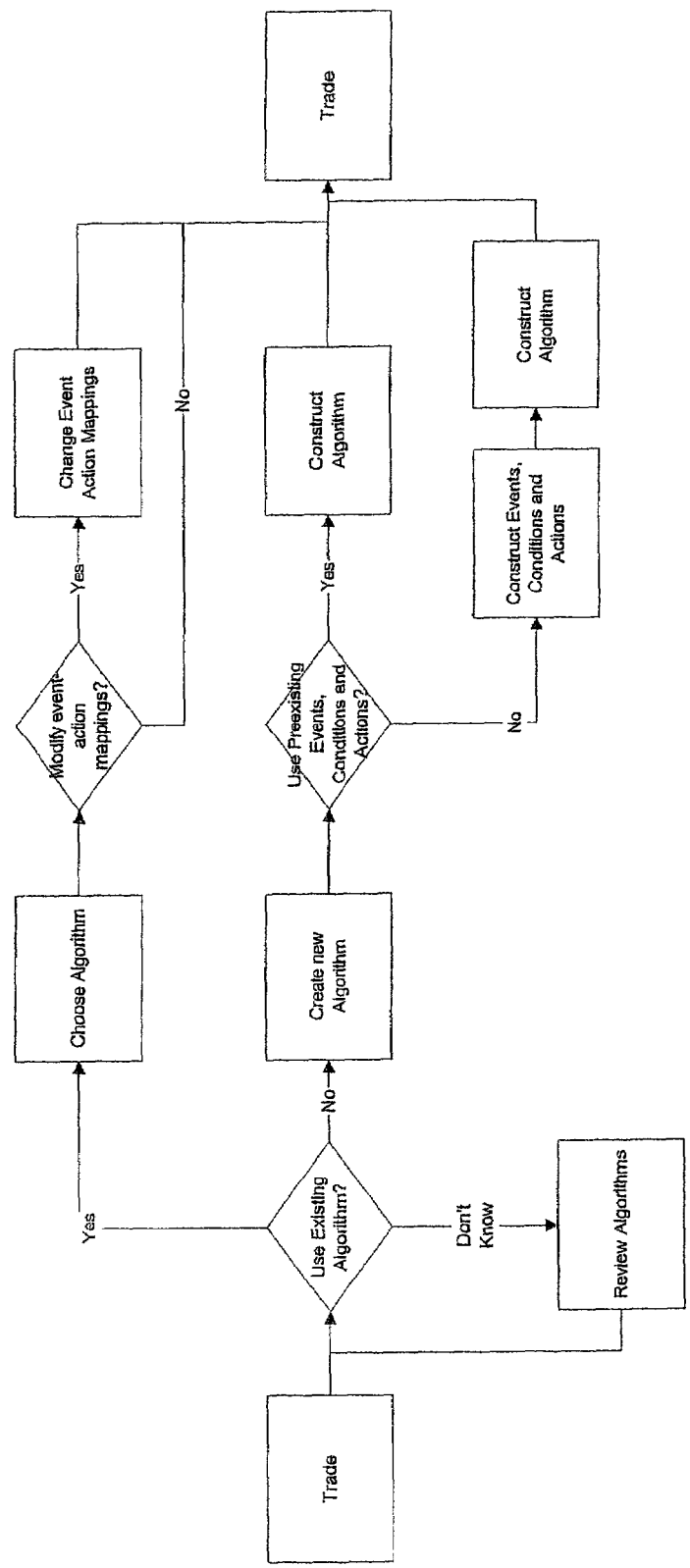
FIG. 9 is a flow chart of a preferred embodiment of the trading system.

FIG. 8 provides a flowchart summarizing processes of a preferred embodiment, from installation to trading. FIG. 9 provides a flowchart summarizing a process for changing a plug-in. Other embodiments may have these processes or other processes with the same or similar steps in these or other orders.

Figure 10:
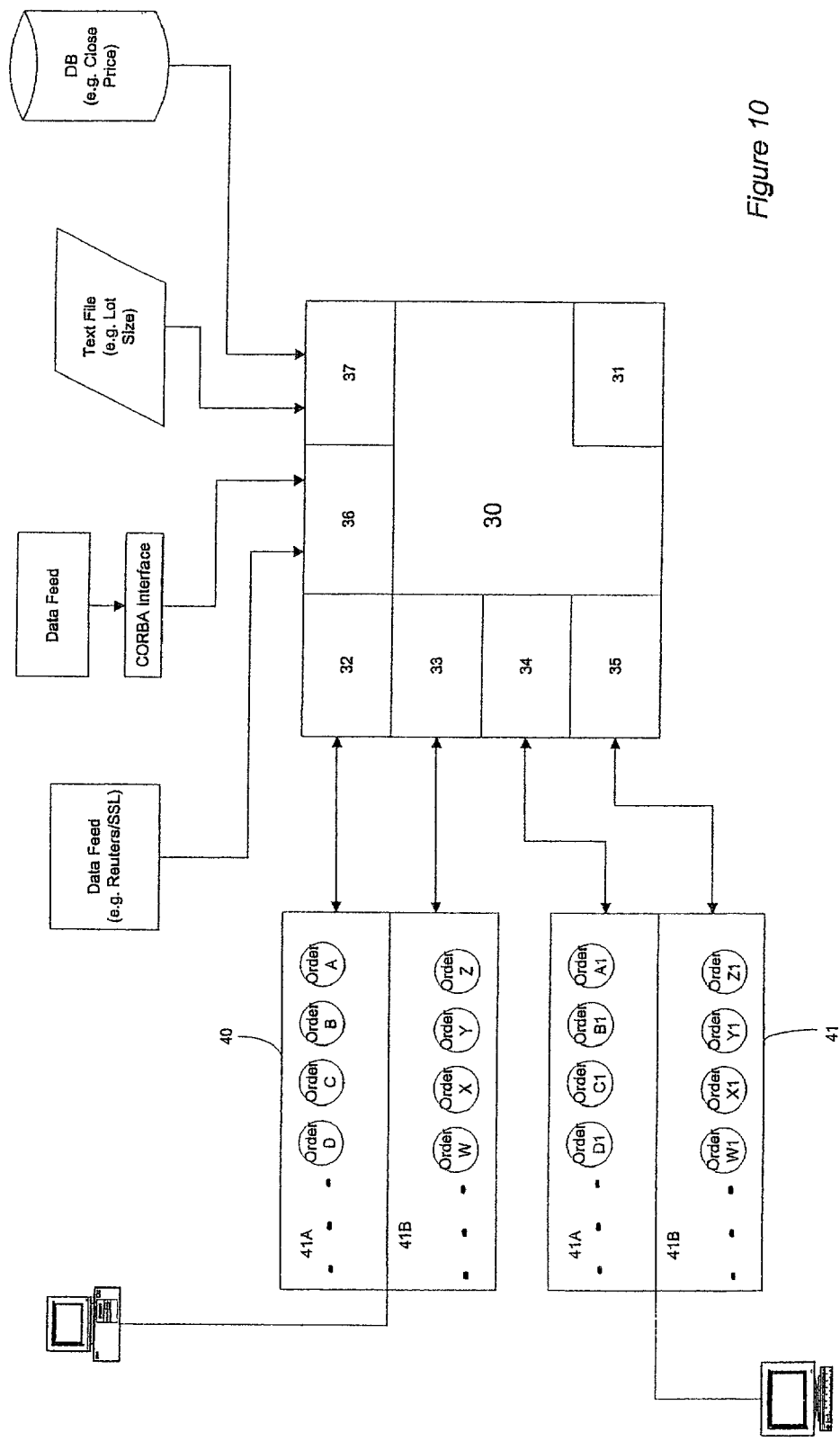
FIG. 10 shows components of a preferred embodiment of the trading system.

FIG. 10 shows a schematic diagram of an especially preferred embodiment. The Core Processing Area 30 is, in this embodiment, the logic engine which processes the order. The Core Processing Area 30 is shown with various interfaces in the form of inputs and outputs. The especially preferred embodiments of the present invention accept input and output from a variety of sources. The sources may change according to the embodiment and in the especially preferred embodiments, the nature of the financial instrument traded (e.g. a particular stock, bond, etc.) helps determine the input and output sources. (It should be noted that input includes but is not limited to inputting data feeds as well as data blocks, such as for example retrieving messages from a message queue. Output includes but is not limited to outputting data feeds as well as data blocks, such as for example outputting messages to a message queue.)

The embodiment of FIG. 10 is configured for trading stocks on the New York Exchange by way of Market Plug-In 31. Stock orders are entered into Ordering System 40 and/or Ordering System 41 (and any other ordering system that may be used) by a trader or another ("trader") using a Graphic User Interface ("GUI"). The GUI provides the trader with the option of selecting various algorithm plug ins to be used. The ordering system in turn interfaces with the logic engine, or in the embodiment of FIG. 10, with the Core Processing Area 30.

An order may be one of two types. One type of order, SimpleOrder, uses simple actions, such as Limit orders (e.g., "Sell 15,000 shares of Microsoft at 35") or Market orders (e.g., "Buy 10,000 shares of Sun at Market".) SimpleOrders are, in this embodiment, not sent to the Core Processing Area 30. Rather, they are executed by some other mechanism, such as by the ordering system, e.g., by 40B or 41B of the Ordering Systems 40 or 41 in FIG. 10.

A second type of order, ComplexOrders, uses higher level algorithms such as Volume Weighted Average Price; Ratio; Gamma Hedge; Aggressive Short Sell; Iceberg; Auto Trader; CB Delta Hedge; Stop Loss; and Short Sell. ComplexOrders usually comprise one or more Suborders. These Suborders can be either other ComplexOrders (which can have further suborders, possibly several levels deep) or SimpleOrders.

For example, assume a trader places a ComplexOrder using a Ratio algorithm:

BUY 10,000 SUNW and SELL 15,000 MSFT whenever the Ratio between the two exceeds 1.2

This order can be deconstructed into two separate Actions, buying 10,000 shares of Sun and selling 15,000 shares of Microsoft, whenever a certain Event happens (the price of Sun over Microsoft exceeds 1.2.) Therefore, this ComplexOrder can be processed by the Core Processing Area 30, into two SimpleOrders, each with an Action (e.g. buying 10,000 shares of Sun) linked to an Event (e.g., when the price of Sun over Microsoft exceeds 1.2.) The two SimpleOrders can then be returned to the Ordering System through an appropriate output driver as is seen in FIG. 10 with regard to, for example, Output Driver 33 and Ordering System 40B.

As can be seen by the above example, higher level algorithms used by ComplexOrders can be comprised of Events and Actions. Once the ComplexOrders are processed to Events and Actions by the logic engine of the preferred embodiments, each Event and Action can be repackaged and executed as a SimpleOrder.

Returning now to FIG. 10, Ordering System 40 and Ordering System 41 interface with Core Processing Area 30 through input drivers and output drivers as described below. As the orders are entered into Ordering System 40, they form a queue in section 40A of Ordering System 40. The orders are then retrieved from the queue by Input Driver 32. Similarly orders from Ordering System 41A are retrieved by Input Driver 34. It should be noted that input drivers are configured according to the input data configuration, and the information input may vary based upon the instrument traded, the user's desires, etc. (The word "driver" and its variants are used herein to mean any code or data interface.) Other embodiments may accept different inputs, through different input drivers. In these embodiments, the drivers may change as the instruments and/or the nature of the trade changes.

Some of the preferred embodiments are able, if they need to, to off-load any computationally intensive calculations, by using a distributed processing module, which proceeds by messaging amongst the components, such as messaging the results of calculations from a calculation component to the Core Processing Area. This off-loading allows more efficient attention to the ordering tasks. Distributed processing also permits for use of "dynamic" constants in executing a complex order. Dynamic constants as that term is used herein are numbers that are used in an algorithm as constants, but also may change during the lifetime of the algorithm. For example, an off-line component may calculate certain alphas, used as constants, for an algorithm. These constants are then sent to the Core Processing Area to be used in future calculations of that particular algorithm. Thus, with a distributed processing system, the alphas may change, but the underlying algorithm remains the same.

Other inputs to the Core Processing Area 30 provide information necessary to execute the inputted orders by providing information on external conditions that may cause the Events and Actions of the order to be met. For example, in order to execute the Sun-Microsoft ComplexOrder example described above, the price ratio of Sun to Microsoft must be calculated by the Core Processing Area 30. In order to calculate the price ratio, the prices of Sun and Microsoft are provided to the Core Processing Area 30 by the data feed drivers.

In the embodiment of FIG. 10, Data Feed 36 accepts information from "dynamic" data feeds (those real time feeds that typically change in fractions of a second), e.g. Reuters SSL, TIB/Rendezvous, etc. Data Feed 36 also accepts indirect input through intermediary interfaces. FIG. 10, for example, shows a CORBA (Common Object Request Broker Architecture) interface into Data Feed Driver 36. The CORBA interface, in turn, collects various market data feeds.

Another input type is static or semi static information flows, e.g., a text file with instrument lot sizes, a database with closing prices, etc. In the embodiment of FIG. 10, this input occurs by way of Instrument Information Driver 37. The instrument information driver provides a mechanism to update information from its sources if necessary. For example, a database with stock closing prices will be updated at the close of the trading session. In the preferred embodiments, updating may occur manually or automatically. Multiple drivers can also be set up to locate information about a particular instrument from different data feeds (e.g., stock pricing, options pricing for that stock, etc.)

It should be noted that the exemplary feeds described herein are used in the preferred embodiments described here, however, in other embodiments these and/or other data feeds with associated drivers, if necessary, may be used.

Also shown in FIG. 10 are two Exchange Drivers 33 and 35 for Ordering Systems 40 and 41 respectively. These output drivers are responsible for sending any orders created by the Core Processing Area 30 to the ordering systems for execution, as will be explained in further detail below.

A ComplexOrder is executed in the preferred embodiments by use of queues. An input driver retrieves a ComplexOrder object from an order queue. The ordering system will have identified the algorithm used by the ComplexOrder so that the Core Processing Area may wrap the order in a corresponding AlgorithmContext object instance. (The corresponding AlgorithmContext instance is based on the algorithm name specified by the order.) The AlgorithmContext object will first register itself with specific event interests. Event interests are those relevant to the particular algorithm and the particular ComplexOrder. So, for example, if the order contains the event "The price of Sun over Microsoft exceeds 1.2" that specific AlgorithmContext object will register the order with an Event Interest object.

It should be noted that a complex ComplexOrder may be used, such as one that contains a multi-instrument order with multi-algorithms. In such an event, an AlgorithmContext Container object is created. This object wraps other AlgorithmContexts within it. The AlgorithmContext Container will then forward all order creation requests to its internal AlgorithmContexts. The instrument identification field for each algorithm provide the necessary identification for proper forwarding. In other embodiments, such as for example when a multi-instrument single algorithm is used, another field besides the instrument identification field may be used to identify the appropriate AlgorithmContext.

Event interests exist in this embodiment to provide a placeholder to an event. A placeholder is needed between the AlgorithmContext object and the event because the event may not exist at the time the order has been input. For example, the Sun-Microsoft price ratio event called for by the above example does not exist. Therefore, any direct call for the event by a AlgorithmContext object would be invalid. Accordingly, an Event Interest object is created instead, which will await the event.

Events may be generated internally, in the Core Processing Area, or be input by way of external sources, or both. So, for example, the Ratio event "The price of Sun over Microsoft exceeds 1.2" is generated internally, as a product of events from external sources. The external sources provide the price tick events, updated through "dynamic" data feeds, that allow the internal calculation and generation of the Ratio event. If the Ratio event reaches the proper level, ("1.2" in the above example) the AlgorithmContext is notified.

Once the events are registered for the particular AlgorithmContext instance, the actions for any particular AlgorithmContext instance will be executed when the events occur. In order to execute the actions for a particular AlgorithmContext, an ActionDispatcher object is used. This object receives requests for dispatching actions when the event occurs and places the actions on an internal queue. So, for example, an ActionDispatcher object might receive an event, e.g. "The price of Sun over Microsoft exceeds 1.2"—and place the corresponding action, e.g. "Buy 10,000 shares of Sun; sell 15,000 shares of Microsoft,"—on the internal queue.

Once the action is placed on the internal queue, those actions requiring orders, e.g. "Buy 10,000 shares of Sun; sell 15,000 shares of Microsoft to the ordering system," send the orders to the ordering system by way of an ActionDispatcher. The order may be sent to any specific ordering system in the various preferred embodiments, and the specific ordering system that the order is sent to will depend upon the interface configuration.

After the ordering system executes the orders, it will send the execution confirmation to the Input driver. If, instead of execution, the order has been cancelled or corrected by the ordering system, the ordering system will send the appropriate message to the Input driver.

Isolating the execution of the actions by means of the ActionDispatcher helps prevent more than one action from the same ComplexOrder executing simultaneously, which is important to accurate execution. For example, if actions did execute simultaneously, there might be an out-of-order result fed back to the ComplexOrder, leading to incorrect execution of the order.

Once the order has been executed by the ordering system, an Order message is fed back to the Exchange driver. The Exchange driver will then create an ExchangeEvent object, which will be disseminated through the Core Processing Area. In an especially preferred embodiment, the ExchangeEvent object is sent to a market gateway component, which creates a SysAction object, to be used internally to update an associated AlgorithmContext object. Of course, it would be possible, in some embodiments, to update the AlgorithmContext object directly. However, the preferred embodiments use of an indirect transfer for the order message helps ensure accuracy in the ordering mechanism by preventing interference with any possible action execution.

The SysAction object is used internally to update the AlgorithmContext object by way of the ActionDispatcher. The ActionDispatcher will also provide any other Event interests with the SysAction object, provided they had registered an interest with that particular AlgorithmContext. When the SysAction object informs the AlgorithmContext object the Actions have been completed (which may include notification of execution, failure to execute, etc.), the AlgorithmContext fires a CloseAction instance. In some preferred embodiments, this will close the order. In other embodiments, the CloseAction instance will trigger a message to the ordering system, which will close the order according to its mechanisms.

The preferred embodiments are not immune from system crashes and therefore the preferred embodiments attempt to ensure accuracy in order tracking and execution by isolating actions through queues and messaging. Moreover, objects, if tracked, can be recreated if the system crashes. SysAction objects, if created, are saved in a journal. If a crash occurs, and upon restarting, the Core Processing Area scans the journal, effectively as an input stream, reading in each SysAction object and providing whatever executions are necessary. This will have the effect of re-creating the order hierarchy as it was before the crash. Additionally, the preferred embodiments use an initialization recovery flag set by the AlgorithmContext object at the beginning of its instantiation. This recovery flag allows for the tracking of and thus re-creation of any registered event interests, as well as initialization and recovery of the order after a crash and subsequent system recovery.

The preferred embodiments also create an image file on a regular basis, perhaps at intervals as short as an hour or so. Every interval, the complete order state is dumped to two alternate mirror image files, which provides backup and possible replacement for the journal. The image files retain an order hierarchy and this hierarchy can be read post crash if necessary. The journal file will then provide the latest update.

The sophistication of the system makes constant testing necessary. Testing can occur through trader feedback, evolution and updating of an algorithm once it is in production. Simulated information feeds can also be used, in the preferred embodiments, to test the system.

Figure 11A:
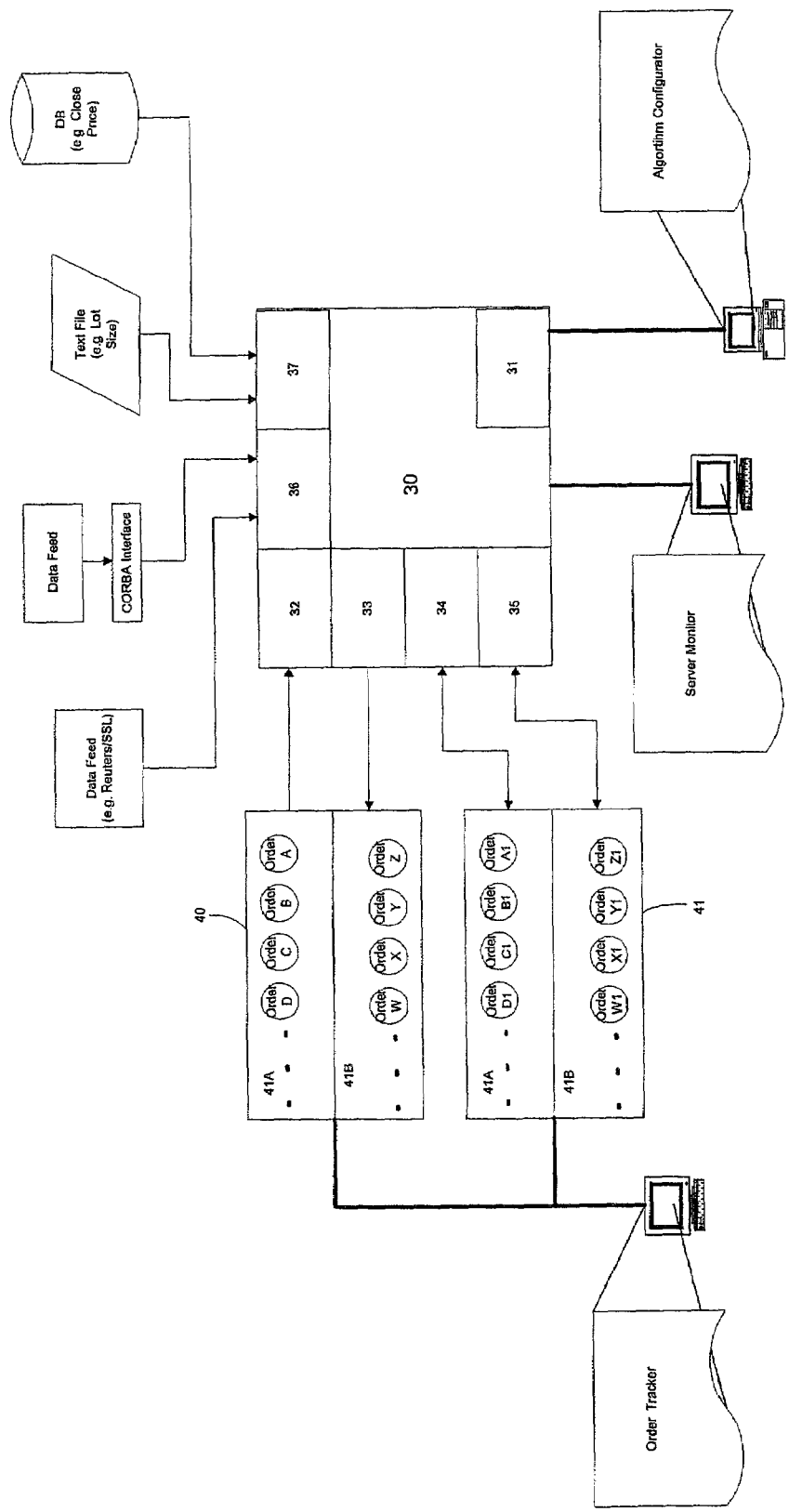
FIG. 11A is a schematic diagram of a preferred embodiment of the trading system.

FIG. 11A shows an example of an preferred embodiment of the interface. The interface is comprised of three sub-interfaces. The sub-interfaces provide the user, administrator or another with the ability to give and receive information by: 1) creating, configuring, modifying and/or editing plug-ins (hereinafter "configure" and its variants); 2) tracking and/or monitoring orders; and, 3) monitoring the performance of an order server, by way of a first sub-interface, a second sub-interface and a third sub-interface respectively. Each of these sub-interfaces will be reviewed in further detail below.

Figure 11B:
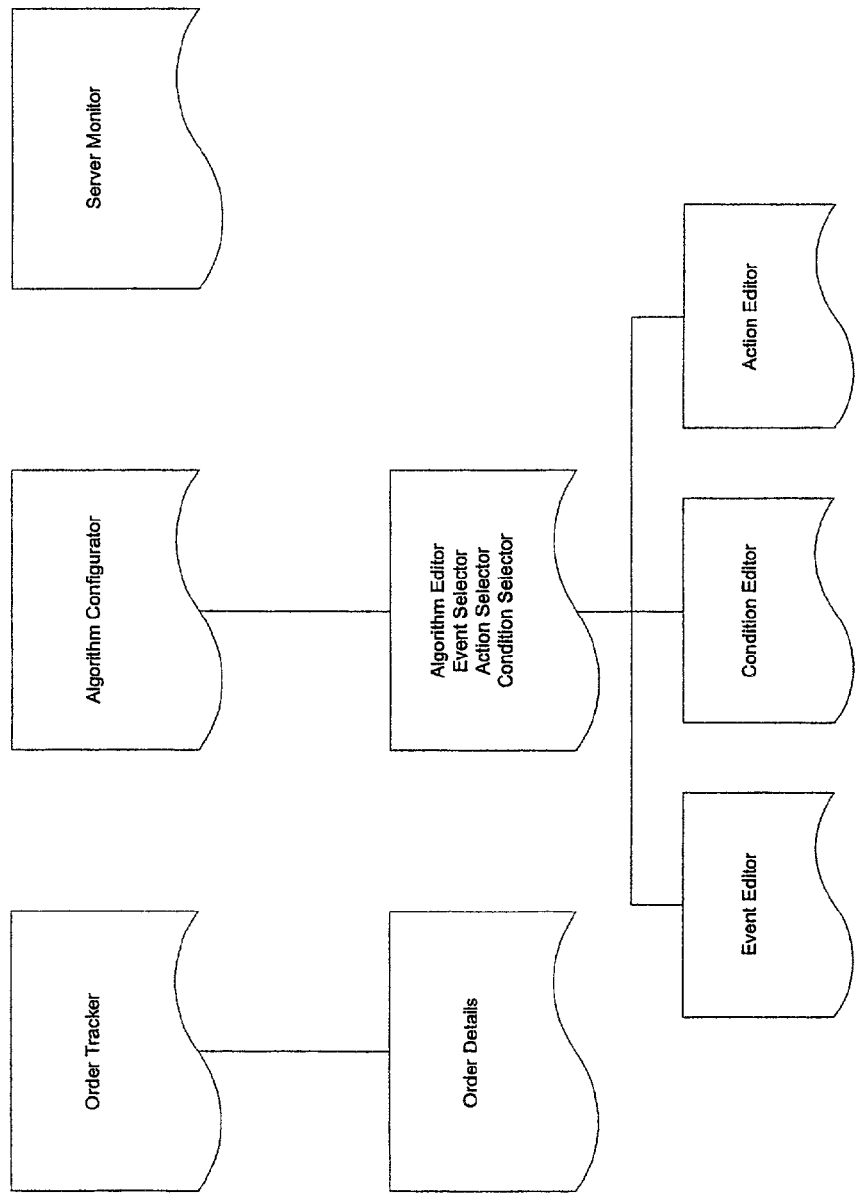
FIG. 11B is a schematic diagram of a preferred embodiment of the trading system.

FIG. 11B shows an overview of the flow through a preferred embodiment. The top level interface is connected to a first sub interface which is an Order Tracker, a second sub interface which is a Plug In Configuration, and a third sub interface which is a Server Monitor. The first sub interface, Order Tracker, is in turn connected to a sub sub interface Order Details. The second sub interface, Plug In Configuration, is connected in turn to a sub sub interface which offers alternatives to an Algorithm Editor interface, an Event Selector interface, an Action Selector interface and a Condition Selector interface. In turn each of these sub sub interfaces are connected to sub sub sub interfaces, which are a an Event Editor interface, a Condition Editor interface and an Action Editor interface.

From the Interface of FIG. 11B, a user may access three sub-interfaces. The Interface as well as the sub interfaces may be, in especially preferred embodiments, graphic user interfaces, and navigation to the sub interfaces is accomplished through various methods known in the art, e.g. tabs, menus, etc. It should be noted that in other embodiments, these interfaces, both top level and below, may be in various orders, other than those shown by the preferred embodiments. For example, an embodiment may only have a single interface. Another embodiment may only have an algorithm editor interface.

Returning now to the preferred embodiment shown in FIG. 11B, various more detailed interfaces of the embodiment are shown at various other figures. For example, an Order Tracker interface is seen at FIG. 12, an Order Details interface at FIG. 13, an Algorithm Configuration interface at FIG. 14, an Algorithm Editor interface at FIG. 16, an Event Editor interface at FIG. 18, an Action Editor interface at FIGS. 19 and 20, and a Server Monitor interface at FIG. 21.

Figure 12:
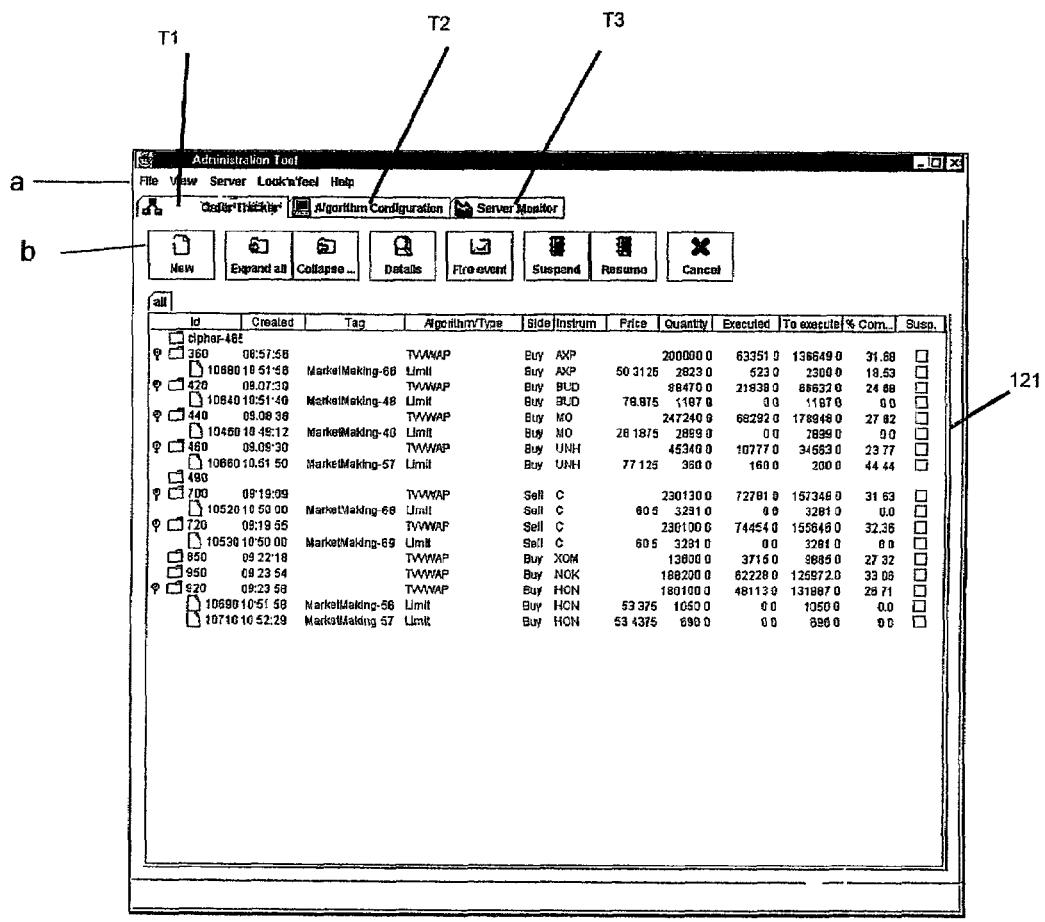
FIG. 12 is a screen shot of a preferred embodiment of the trading system.

Turning now to the embodiment of FIG. 12, an Order Tracker sub-interface embedded within an Interface screen is seen, which allows users to monitor orders. The sub-interface is implemented as a graphical user interface (GUI) in the especially preferred embodiments and FIG. 12 shows a screen shot of a GUI implementation. The Order Tracker tab is highlighted in FIG. 12, which has provided the Order Tracker interface screen, within the Interface screen of this embodiment. As will be described in more detail below, the selection of the Order Tracker tab T1, the Algorithm Configuration tab T2, or the Server Monitor tab T3 from the Interface of this embodiment provides access to the various sub interfaces. In other embodiments, other interfaces and navigation and/or selection devices known in the art may be used, such as pull down menus, links, buttons, vertical tabs, etc. The available movement may be different in different embodiments as well, including navigation among interfaces other than those shown here, as well as variations on navigational tools.

The Order Tracker sub-interface may be connected to order servers 40 and 41, as shown in FIG. 11A. This connection does not have to be direct in various embodiments, e.g., the connection may be through networks and through other computers.

The menu options of FIG. 12 are shown generally at a. These include File, View, Server (providing a view over the desired Order server,) Look n' Feel (providing control over the colors etc. of the screen) and Help. The pull down options from these menus are as known in the art. Also shown at FIG. 12, at b, are various icons. These allow for changes in the listing seen in the Order Section area 121. The New icon seen at area b, provides for the entry of test trades. The Expand All icon provides expansion of details on any particular order. The Collapse icon provides a collapsed view on the icons. The Order Details icon navigates to the details screen, as explained in further detail below. The Fire Event icon provides an override and immediate firing of an order. The Suspend icon allows for suspension of the order and the Resume icon allows for resumption of suspended orders. The Cancel icon will cancel orders.

The Order Section 121 of the interface of FIG. 12 shows a listing of various order data, including order identification, the time and date the order was created, the tag which is an internal identifier for the trade originator, the algorithm including type used on the order, the side of the trade (e.g., buy or sell), the instrument of the order (e.g., stock, bond, etc.), the price, the quantity, the quantity or amount of the order that has been executed, the amount remaining to be executed, the percent completed, and a check box indicating if the order has been suspended. Details on orders, including Complex Orders, can be displayed as well. For example, the order with ID 920 is a Complex Order comprised of two Simple Orders 10690 and 10710.

Figure 13:
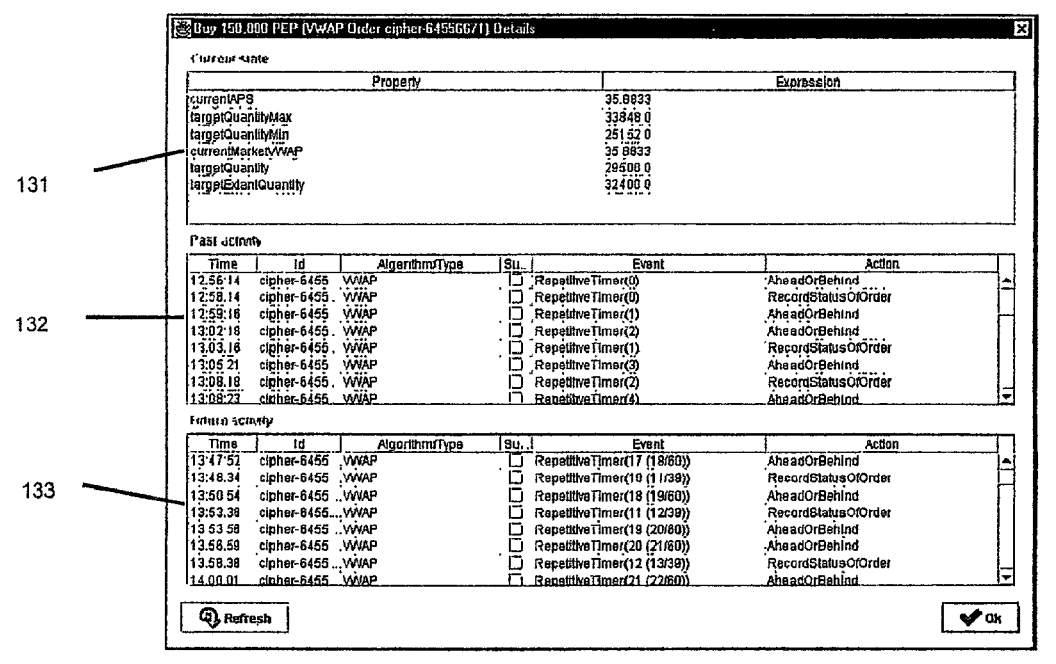

From the Order Tracker screen of FIG. 12 a user can navigate to the Order Detail interface which is a GUI in this embodiment, and a typical screen shot of the GUI of the embodiment is seen at FIG. 13. The Order Detail interface provides detail of a particular order as well as the history of orders. The user can select a particular order (e.g., by order ID) in FIG. 12 to be displayed in the Order Detail interface by several methods. For example, a particular order can be selected by using a mouse, right clicking on the order, thus activating a pull down menu, and selecting an navigation option from that menu. Alternatively, a user can click on an order, thus highlighting the order and then select an option for the Order Detail screen from a View pull down menu.

The Order Detail screen has three sections: a) Current State section 131, b) Past Activity section 132, and c) Future Activity section 133. The Current State section 131 shows the current state of the order properties. The Past Activity Section 132 show the past events that have occurred on the order. The Future Activity section 133 shows the events that will occur in the future with an optional time component.

It should be noted that the Order Tracker and Order Detail sub interfaces of FIGS. 12 and 13 may be of different configurations, and have other components, in other embodiments. Additionally, one or more of these interfaces may not be present in other embodiments.

Figure 14:
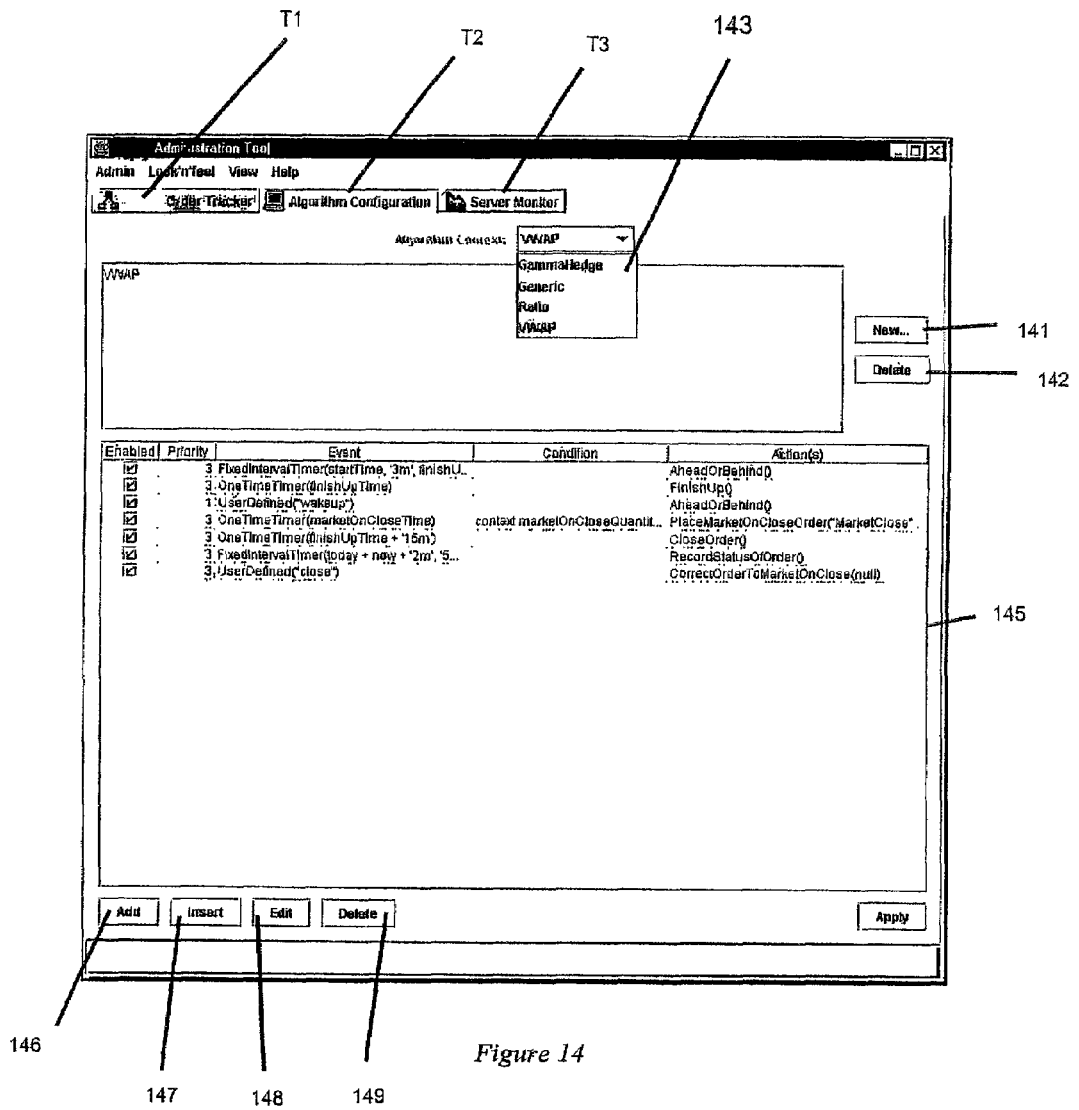
FIG. 14 is a screen shot of a preferred embodiment of the trading system.

Turning now to FIG. 14, the Algorithm Configuration sub-interface that results from selecting the Algorithm Configuration tab T2 of the Interface of this embodiment is seen. The sub-interface comprises a GUI in this embodiment, and a typical screen shot is shown in the Figure. The Algorithm Configuration screen allows the user to create, delete and/or configure a preexisting plug in, shown here as a drop down window 143 labeled algorithm context. Buttons 141 and 142 allow new plug ins to be added or deleted. Any particular plug in component may be enabled as desired, by checking the appropriate box in the enabled column. Also priorities may be assigned the component in execution, so that, for example, any particular component may be run in an order besides the usual order by establishing a different priority for that component.

Figure 15:
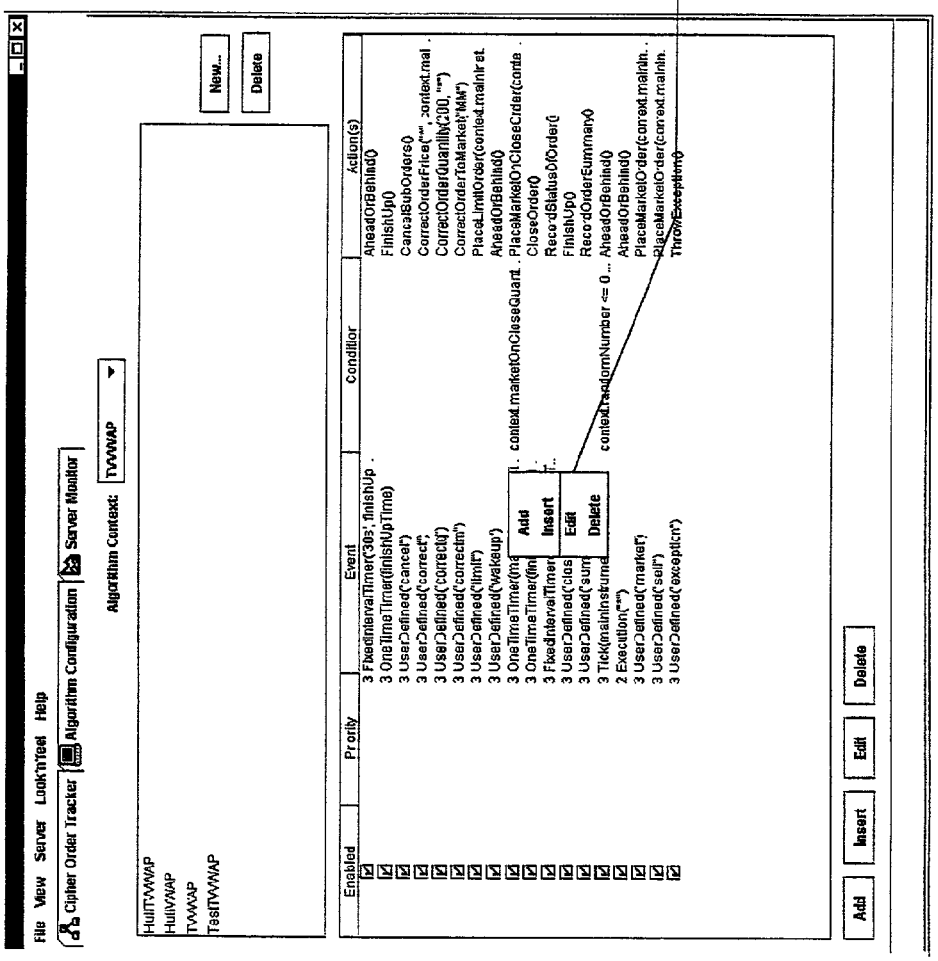
FIG. 15 is a screen shot of a preferred embodiment of the trading system.

Editing assistance is provided in this embodiment through Editing screen 145. The plug in being edited is displayed, along with any components, such as the Event-Action pairings and Conditions, if the latter exist, shown in the Figure for the particular VWAP plug in shown. The components may be edited and deleted from the plug in, and new components may be added or inserted as desired. The buttons 146, 147, 148, and 149 enable the add, insert, edit and delete functions as shown on FIG. 14. FIG. 15 shows another method of adding, inserting, editing or deleting the various component plug ins, by use of a pop up menu 151, accessed by right clicking on the particular component. It should be noted that the sub interfaces of FIGS. 14 and 15 may be of different configurations, and have other components, in other embodiments. Additionally, one or more of these interfaces may not be present in other embodiments.

Figure 16:
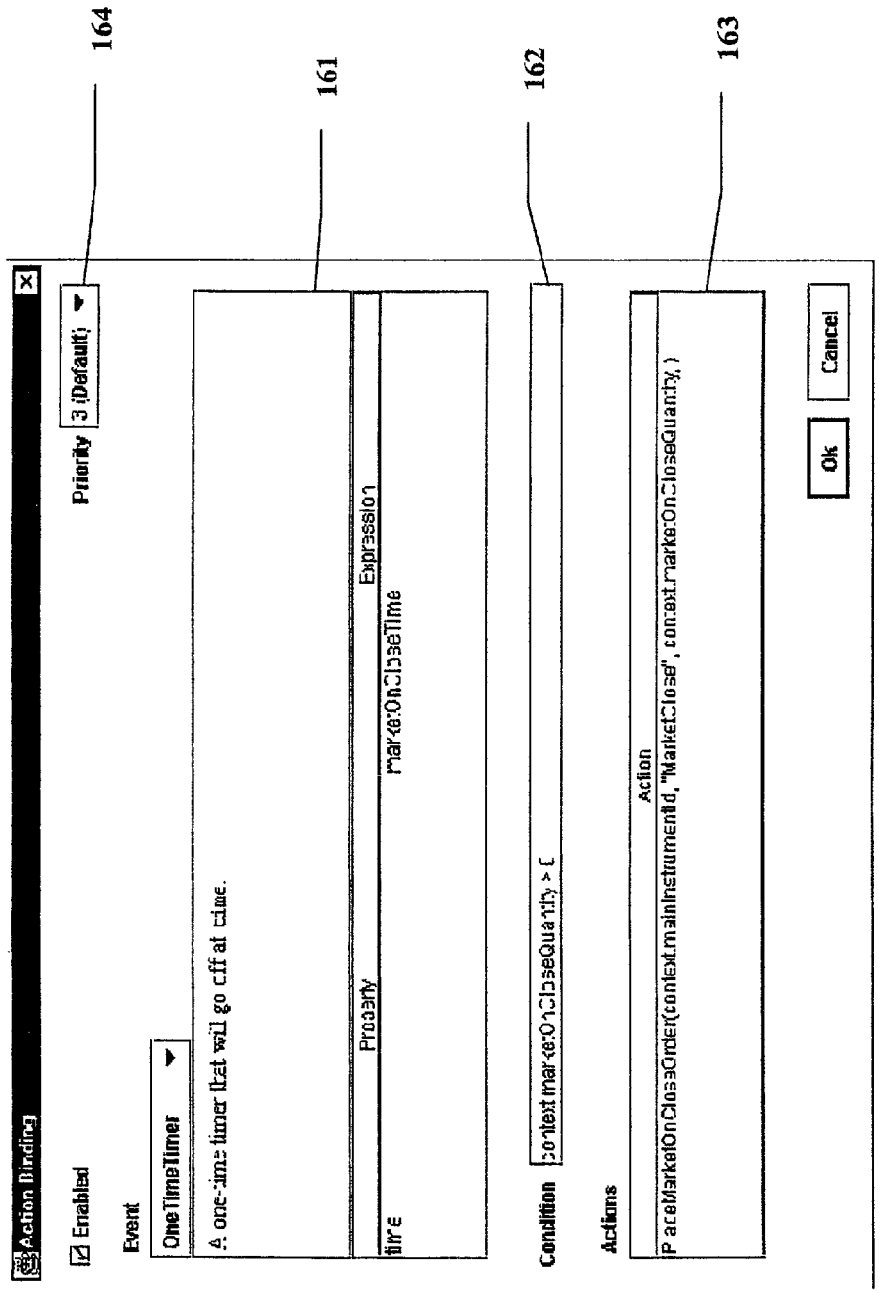
FIG. 16 is a screen shot of a preferred embodiment of the trading system.

If the edit function is selected, an Algorithm Editor interface, or GUI, is presented. A typical screen shot of an Algorithm Editor interface is shown at FIG. 16. The screen shot of FIG. 16 shows an Algorithm Editor screen for an event-action pair in the TVVWAP algorithm context. The Algorithm Editor screen is comprised of various fields in this embodiment: 1) an Event field 161, which is comprised of a Description field, a Property field, and an Expression field; 2) A Condition field 162; 3) An Action field 163; and 4) A Priority field section 164. Additionally an Enabled box 165 allows the checkoff of an Enabled variable. The sample Event shown in FIG. 16 is the OneTimeTimer Event, and has, as a default, the various descriptions and other components as shown in the Figure. Each of these may be edited or otherwise modified by the user as desired.

Figure 17:
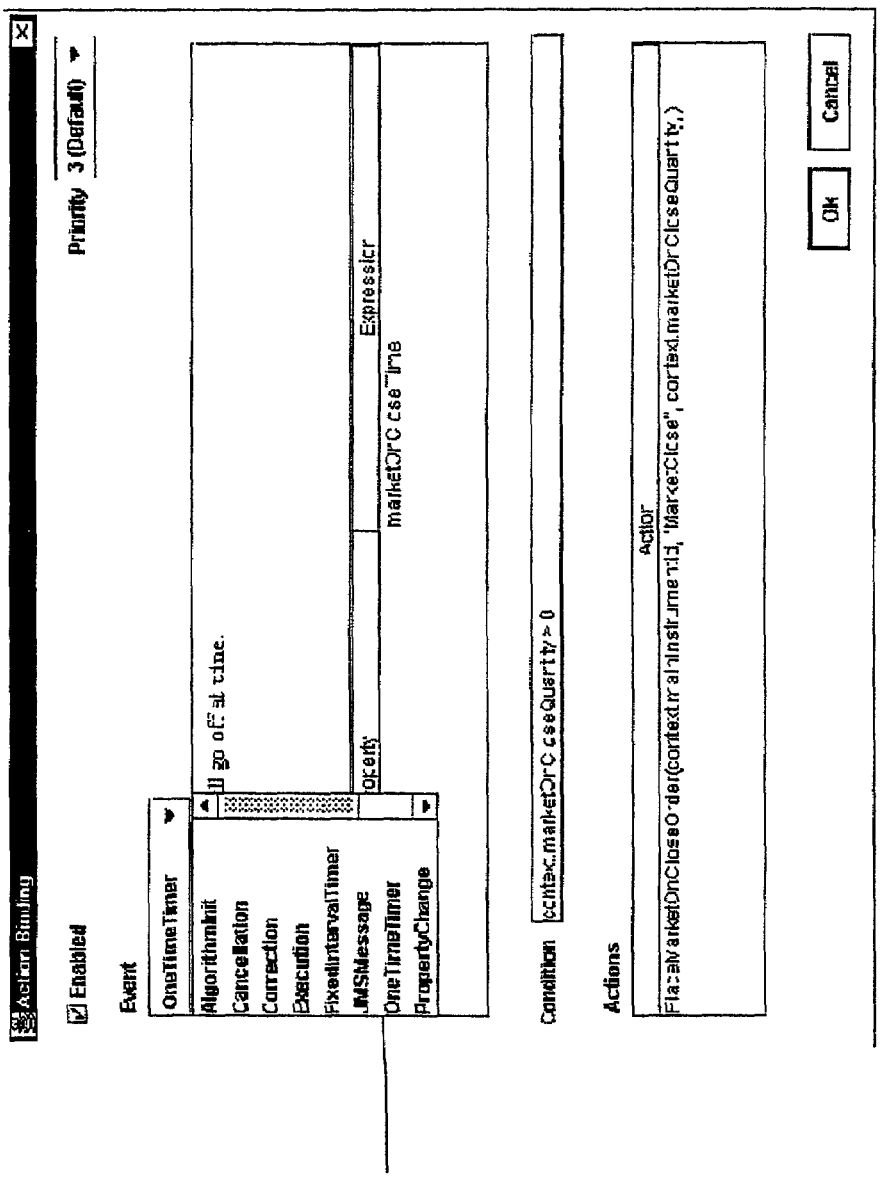
FIG. 17 is a screen shot of a preferred embodiment of the trading system.
Figure 18:
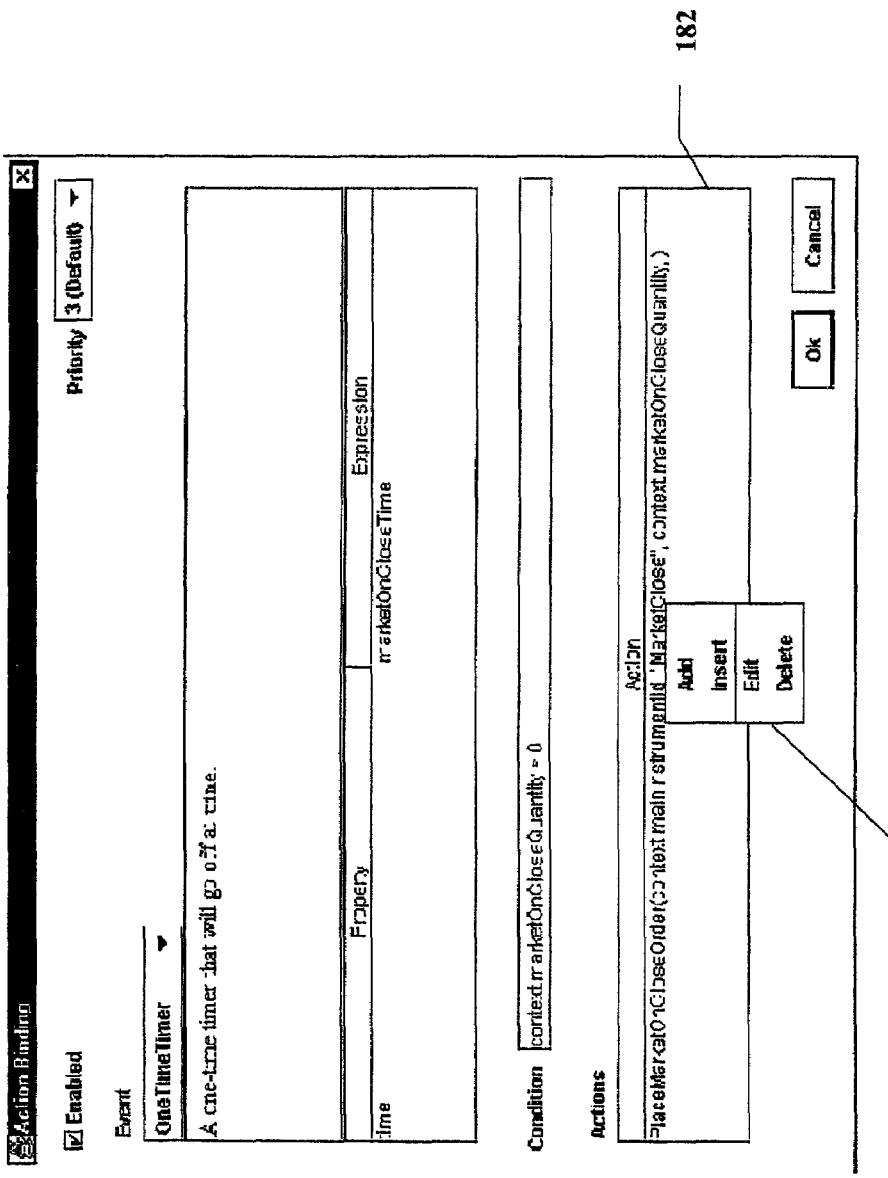
FIG. 18 is a screen shot of a preferred embodiment of the trading system.

The choice of which preselected Event may be edited may be through a drop down box 171, as shown in FIG. 17, which provides the user with other possible Events to edit. Upon selection of any of these, the various fields will be filled with the appropriate components, which then be modified as desired. One method of modification used in the especially preferred embodiments is seen at FIG. 18, which shows a drop down menu 181 appearing when a user selects an action displayed in the action section 182 and right clicks on the action. Of course, other embodiments may use other editing methods as known in the art, including pop up word processing editors, database field editors, etc.

As shown by FIGS. 16-18, the Algorithm editor of the preferred embodiments provides the user with the ability to configure the Action Bindings, as Action Bindings are used in the Algorithm type of plug in. Other embodiments may use a different editor or editors for algorithms, or may use a different editor or editors for different plug ins. It should also be noted that the sub interfaces of FIGS. 14-18 may be of different configurations, and have other components, in other embodiments. Additionally, one or more of these interfaces may not be present in other embodiments.

Figure 19:
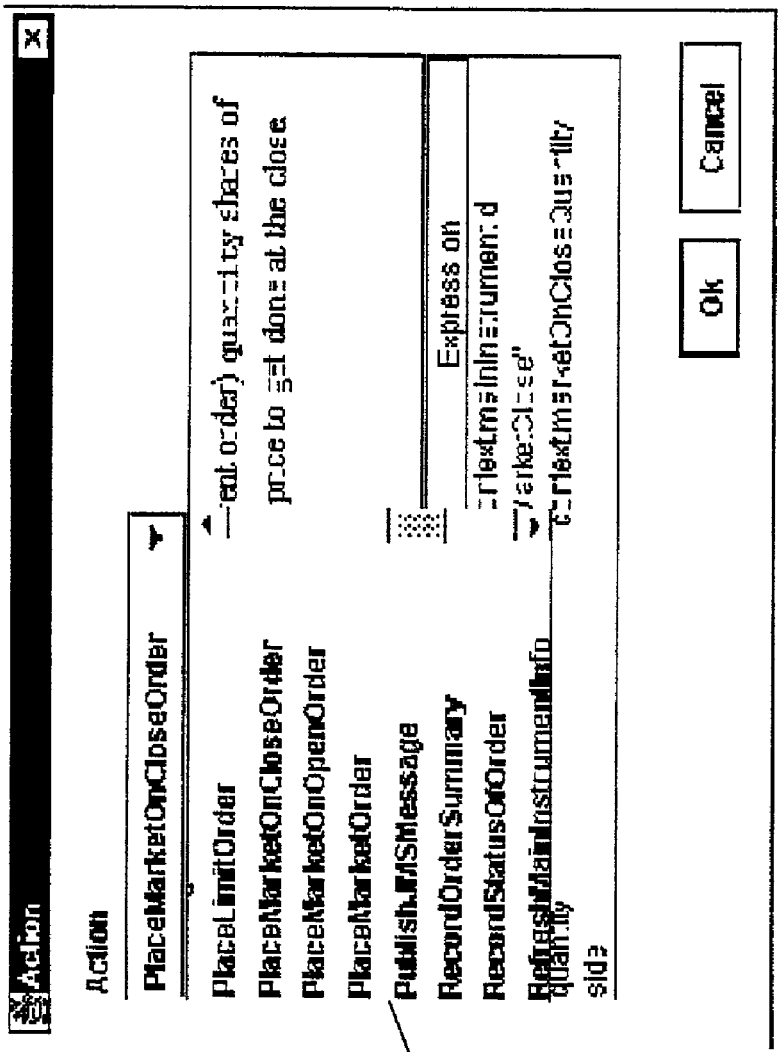
FIG. 19 is a screen shot of a preferred embodiment of the trading system.
Figure 20:
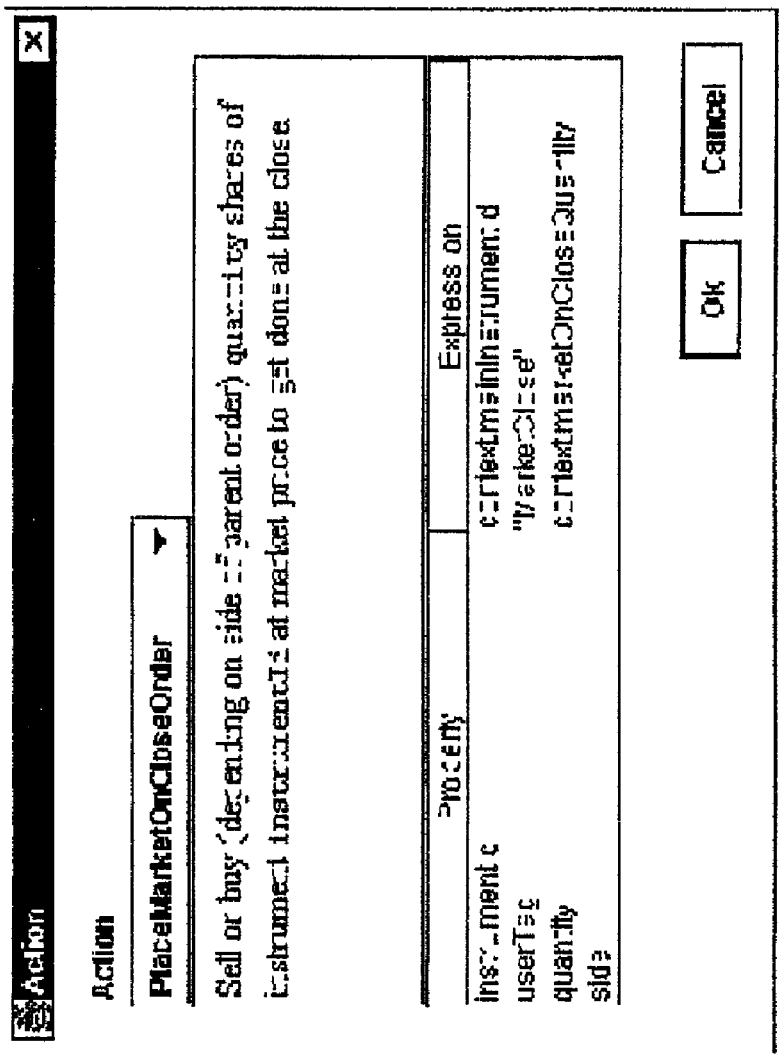
FIG. 20 is a screen shot of a preferred embodiment of the trading system.

Actions may also be edited, if they are a component of the plug in, such as when an algorithm plug in is being configured. FIG. 19 shows a typical screen shot of an Action Editor interface of a preferred embodiment. A drop down menu 191 permits accessing preexisting Actions. In the typical screen shown at FIG. 19, the Action "placemarketonCloseOrder" action has been selected. As seen in FIG. 20, certain default components for the selected Action will then appear, once the Action is selected. In the embodiment of the Figure, these are Description, Property and Expression components. Each of these can then be edited, if desired, using a right click drop down menu or other editing methods known in the art. It should also be noted that the sub interfaces of FIGS. 19-20 may be of different configurations, and have other components, in other embodiments. Additionally, one or more of these interfaces may not be present in other embodiments.

Figure 21:
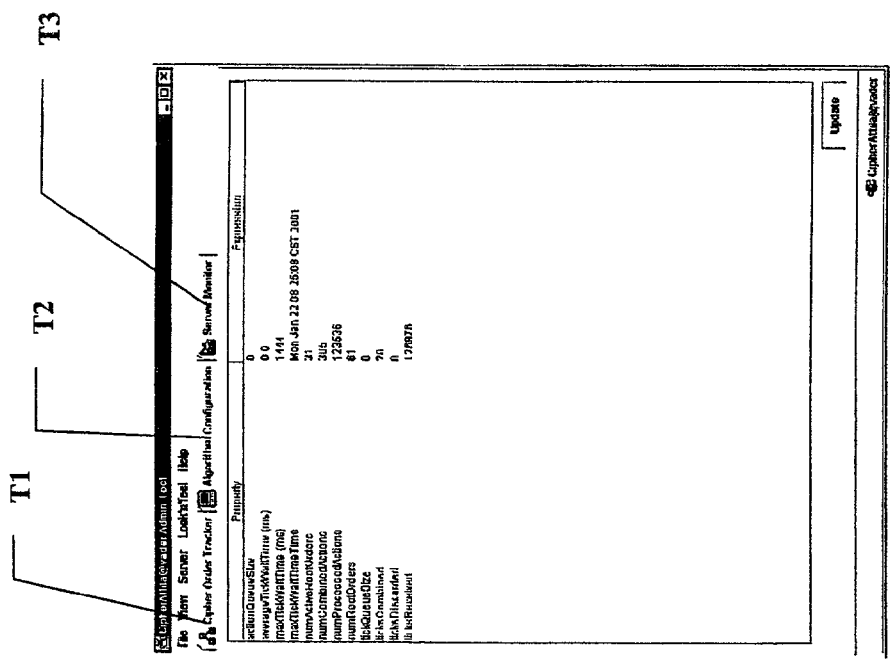
FIG. 21 is a screen shot of a preferred embodiment of the trading system.

A third sub-interface is shown in FIG. 21. This sub-interface is for a Server Monitor sub-interface as shown in FIG. 11A and FIG. 11B. This third sub-interface enables a user to monitor the logic engine server used to process trading orders. In the embodiment of FIG. 21, the monitored fields are Property and Expression, although of course in other embodiments other data may be monitored or the sub-interface dispensed with entirely. The Server Monitor, in the embodiment of FIG. 21, also has an Update button in order to refresh and update the information. It should also be noted that the sub interface of FIG. 21 may be of different configurations, and have other components, in other embodiments.

The preferred interface and associated software for trading is provided in a GUI using windows and is constructed in Java, using Swing. However, any environment known in the art may be used and it should be specifically understood that embodiments can be implemented in environments that support GUI and other interfaces, including but not limited to Microsoft Windows 2000®, Windows 95®, 98®, ME®, Unix® and Unix—like platforms, including but not limited to Linux® and its variants as well as other operating system platforms including but not limited to IBM OS/390®, MacOS®, VxWorks®, etc. Additionally embodiments may be constructed in languages known in the art such as C++.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

We claim:

1. An article of manufacture comprising:
   a computer usable medium having computer readable program code means embodied therein for implementing a logic engine and an interface, the computer readable program code means in said article of manufacture comprising:
   computer readable program code means for causing said logic engine to perform an algorithm for implementing a trading strategy; and
   computer readable program code means for implementing said interface, said interface including a first sub-interface and a second sub-interface, wherein:
      said first sub-interface is for allowing a user to modify said algorithm by changing a mapping between an event and an action;
      said second sub-interface is for allowing the user to review details of orders executed by the logic engine; and
      said interface is for allowing the user to navigate among said first and second sub-interfaces.

2. The article of manufacture of claim 1 wherein said interface comprises a graphical user interface.

3. The article of manufacture of claim 1 wherein said first sub-interface comprises a graphical user interface.

4. The article of manufacture of claim 1 wherein:
   said interface further comprises a third sub-interface which allows the user to monitor operation of a server computer that executes the logic engine; and
   said interface allows the user to navigate among said first, second and third sub-interfaces.

5. The article of manufacture of claim 1, wherein the trading strategy is selected from the group consisting of:
   (a) a Volume-Weighted-Average-Price strategy;
   (b) a Ratio strategy;
   (c) a Gamma Hedge strategy;
   (d) an Iceberg strategy; and
   (e) a GB Delta Hedge strategy.

6. The article of manufacture of claim 1, wherein the first sub-interface includes an event editor interface, a condition editor interface and an action editor interface.

7. The article of manufacture of claim 1, wherein said action is placement of a securities trading order.

8. A method for computerized trading comprising:
   providing a logic engine with an algorithm for implementing a trading strategy;
   providing an interface that includes a first sub-interface and a second sub-interface;
   using the first sub-interface to modify said algorithm by changing a mapping between an event and an action;
   processing a trade using said logic engine with said modified algorithm; and
   using the second sub-interface to review details of orders executed by the logic engine.

9. The method of claim 8, wherein said interface also includes a third sub-interface, and the method further comprising:
   using said third sub-interface to monitor operation of a server computer which executes the logic engine.

10. The method of claim 8, wherein the trading strategy is selected from the group consisting of:
    (a) a Volume-Weighted-Average-Price strategy;
    (b) a Ratio strategy;
    (c) a Gamma Hedge strategy;
    (d) an Iceberg strategy; and
    (e) a GB Delta Hedge strategy.

11. The method of claim 8, wherein the first sub-interface includes an event editor interface, a condition editor interface and an action editor interface.

12. The method of claim 8, wherein said action is placement of a securities trading order.

* * * * *